(12) United States Patent
Myers et al.

(10) Patent No.: US 7,105,773 B2
(45) Date of Patent: Sep. 12, 2006

(54) ELECTRIC ARC WELDER

(75) Inventors: Russell K. Myers, Hudson, OH (US); Timothy M. O'Donnell, Chesterland, OH (US); Alonzo P. O. Yost, North Canton, OH (US)

(73) Assignee: Lincoln Global, Inc., Sante Fe Springs, CA (US)

( * ) Notice: Subject to any disclaimer, the term of this patent is extended or adjusted under 35 U.S.C. 154(b) by 274 days.

(21) Appl. No.: 10/754,836

(22) Filed: Jan. 12, 2004

(65) Prior Publication Data

US 2006/0037952 A1 Feb. 23, 2006

(51) Int. Cl.
*B23K 9/09* (2006.01)

(52) U.S. Cl. .................................. 219/130.51
(58) Field of Classification Search ........... 219/130.51, 219/130.1, 124.03
See application file for complete search history.

(56) References Cited

U.S. PATENT DOCUMENTS

| 2,669,640 A | * | 2/1954 | Outcalt et al. | ......... 219/124.03 |
| 4,246,463 A | | 1/1981 | Shutt | |
| 5,278,390 A | | 1/1994 | Blankenship | |
| 6,111,216 A | | 8/2000 | Stava | |
| 6,207,929 B1 | | 3/2001 | Stava | |
| 6,291,798 B1 | | 9/2001 | Stava | |
| 6,472,634 B1 | | 10/2002 | Houston | |

OTHER PUBLICATIONS

The Lincoln Electric Company—*Another Arc Welding Development—The Lincoln One Side System*—Jun. 1992.

* cited by examiner

*Primary Examiner*—Clifford C. Shaw
(74) *Attorney, Agent, or Firm*—Fay, Sharpe, Fagan Minnich & McKee, LLP

(57) ABSTRACT

An electric arc welder for depositing weld metal along a groove between two edges of a metal workpiece where the welder comprises a first electrode driven by a first wire feeder toward a point in said groove, a second electrode driven by a second wire feeder toward the point and a main power source with a first output terminal connected to the first electrode and a second output terminal connected both to the second electrode and directly or indirectly to the metal workpiece to create a second electrode path and a workpiece path. The power source includes a high speed switching output stage for creating current with a selected AC waveform between the first and second output terminals where the waveform of the main power source is generated by a waveform generator controlling a pulse width modulator circuit to determine the current operation of the output stage.

125 Claims, 16 Drawing Sheets

ELECTRIC ARC WELDER

The present invention relates to the art of electric arc welding and more particularly to an electric arc welder system to operate tandem electrodes.

INCORPORATION BY REFERENCE

The present invention is directed to an electric arc welding system utilizing high capacity alternating circuit power sources for driving two or more tandem electrodes of the type used in seam welding of large metal blanks. Although the invention can be used with any standard AC power supply with switches for changing the output polarity, it is preferred that the power supplies use the switching concept disclosed in Stava U.S. Pat. No. 6,111,216 wherein the power supply is an inverter having two large output polarity switches with the arc current being reduced before the switches reverse the polarity. The power source can be a chopper operated at high switching speeds. Consequently, the term "switching point" is a complex procedure whereby the power supply is first turned off awaiting a current less than a preselected value, such as 100 amperes. Upon reaching the 100 ampere threshold, the output switches of the power supply are reversed to reverse the polarity from the D.C. output link of the inverter. Thus, the "switching point" is an off output command, known as a "kill" command, to the power supply inverter followed by a switching command to reverse the output polarity. The kill output can be a drop to a decreased current level. This procedure is duplicated at each successive polarity reversal so the AC power supply reverses polarity only at a low current. In this manner, snubbing circuits for the output polarity controlling switches are reduced in size or eliminated. Since this switching concept is preferred to define the switching points as used in the present invention, Stava U.S. Pat. No. 6,111,216 is incorporated by reference. The concept of an AC current for tandem electrodes is well known in the art. U.S. Pat. No. 6,207,929 discloses a system whereby tandem electrodes are each powered by a separate inverter type power supply. The frequency is varied to reduce the interference between alternating current in the adjacent tandem electrodes. Indeed, this prior patent of assignee relates to single power sources for driving either a DC powered electrode followed by an AC electrode or two or more AC driven electrodes. In each instance, a separate inverter type power supply is used for each electrode and, in the alternating current high capacity power supplies, the switching point concept of Stava U.S. Pat. No. 6,111,216 is employed. This system for separately driving each of the tandem electrodes by a separate high capacity power supply is background information to the present invention and is incorporated herein as such background. In a like manner, U.S. Pat. No. 6,291,798 discloses a further arc welding system wherein each electrode in a tandem welding operation is driven by two or more independent power supplies connected in parallel with a single electrode arc. The system involves a single set of switches having two or more accurately balanced power supplies forming the input to the polarity reversing switch network operated in accordance with Stava U.S. Pat. No. 6,111,216. Each of the power supplies is driven by a single command signal and, therefore, shares the identical current value combined and directed through the polarity reversing switches. This type system requires large polarity reversing switches since all of the current to the electrode is passed through a single set of switches. U.S. Pat. No. 6,291,798 does show a master and slave combination of power supplies for a single electrode and discloses general background information to which the invention is directed. For that reason, this patent is also incorporated by reference. An improvement for operating tandem electrodes with controlled switching points is disclosed in Houston U.S. Pat. No. 6,472,634. This patent is incorporated by reference.

The tandem electrodes of the present invention have two leading electrodes as disclosed in Shutt U.S. Pat. No. 4,246,463 and in a publication by The Lincoln Electric Company of Cleveland, Ohio entitled "Another Arc Welding Development." These items showing a modified series lead electrode revision of a tandem arc welder, i.e. welder system, are incorporated by reference herein as background technology which need not be revisited.

BACKGROUND OF INVENTION

Welding applications, such as pipe welding, often require high currents and use several arcs created by tandem electrodes. Such welding systems are quite prone to certain inconsistencies caused by arc disturbances due to magnetic interaction between two adjacent tandem electrodes. A system for correcting the disadvantages caused by adjacent AC driven tandem electrodes is disclosed in Stava U.S. Pat. No. 6,207,929. In that prior patent, each of the AC driven electrodes has its own inverter based power supply. The output frequency of each power supply is varied so as to prevent interference between adjacent electrodes. This system requires a separate power supply for each electrode. As the current demand for a given electrode exceeds the current rating of the inverter based power supply, a new power supply must be designed, engineered and manufactured. Thus, such system for operating tandem welding electrodes require high capacity or high rated power supplies to obtain high current as required for pipe welding. To decrease the need for special high current rated power supplies for tandem operated electrodes, assignee developed the system disclosed in Stava U.S. Pat. No. 6,291,798 wherein each AC electrode is driven by two or more inverter power supplies connected in parallel. These parallel power supplies have their output current combined at the input side of a polarity switching network. Thus, as higher currents are required for a given electrode, two or more parallel power supplies are used. In this system, each of the power supplies are operated in unison and share equally the output current. Thus, the current required by changes in the welding conditions can be provided only by the over current rating of a single unit. A current balanced system did allow for the combination of several smaller power supplies; however, the power supplies had to be connected in parallel on the input side of the polarity reversing switching network. As such, large switches were required for each electrode. Consequently, such system overcame the disadvantage of requiring special power supplies for each electrode in a tandem welding operation of the type used in pipe welding; but, there is still the disadvantage that the switches must be quite large and the input, paralleled power supplies must be accurately matched by being driven from a single current command signal. Stava U.S. Pat. No. 6,291,798 does utilize the concept of a synchronizing signal for each welding cell directing current to each tandem electrode. However, the system still required large switches. This type of system was available for operation in an ethernet network interconnecting the welding cells. In ethernet interconnections, the timing cannot be accurately controlled. In the system described, the switch timing for a given electrode need only be shifted on a time basis, but need not be accurately identified for a specific time. Thus, the described system requiring balancing the current and a single switch network has been the manner of obtaining high capacity current for use in tandem arc welding operations when using an ethernet network or an internet and ethernet control system. There is a desire to control welders by an ethernet network, with or without an internet link. Due to timing limitation, these networks dictated use of tandem electrode systems of the type using only general synchronizing techniques.

Such systems could be controlled by a network; however, the parameter to each paralleled power supply could not be varied. Each of the cells could only be offset from each other by a synchronizing signal. Such systems were not suitable for central control by the internet and/or local area network control because an elaborate network to merely provide offset between cells was not advantageous. Houston U.S. Pat. No. 6,472,634 discloses the concept of a single AC arc welding cell for each electrode wherein the cell itself includes one or more paralleled power supplies each of which has its own switching network. The output of the switching network is then combined to drive the electrode. This allows the use of relatively small switches for polarity reversing of the individual power supplies paralleled in the system. In addition, relatively small power supplies can be paralleled to build a high current input to each of several electrodes used in a tandem welding operation. The use of several independently controlled power supplies paralleled after the polarity switch network for driving a single electrode allows advantageous use of a network, such as the internet or ethernet.

In Houston U.S. Pat. No. 6,472,634, smaller power supplies in each system are connected in parallel to power a single electrode. By coordinating switching points of each paralleled power supply with a high accuracy interface, the AC output current is the sum of currents from the paralleled power supplies without combination before the polarity switches. By using this concept, the ethernet network, with or without an internet link, can control the weld parameters of each paralleled power supply of the welding system. The timing of the switch points is accurately controlled by the novel interface, whereas the weld parameters directed to the controller for each power supply can be provided by an ethernet network which has no accurate time basis. Thus, an internet link can be used to direct parameters to the individual power supply controllers of the welding system for driving a single electrode. There is no need for a time based accuracy of these weld parameters coded for each power supply. In the preferred implementation, the switch point is a "kill" command awaiting detection of a current drop below a minimum threshold, such as 100 amperes. When each power supply has a switch command, then they switch. The switch points between parallel power supplies, whether instantaneous or a sequence involving a "kill" command with a wait delay, are coordinated accurately by an interface card having an accuracy of less than 10 μs and preferably in the range of 1–5 μs. This timing accuracy coordinates and matches the switching operation in the paralleled power supplies to coordinate the AC output current.

By using the internet or ethernet local area network, the set of weld parameters for each power supply is available on a less accurate information network, to which the controllers for the paralleled power supplies are interconnected with a high accuracy digital interface card. Thus, the switching of the individual, paralleled power supplies of the system is coordinated. This is an advantage allowing use of the internet and local area network control of a welding system. The information network includes synchronizing signals for initiating several arc welding systems connected to several electrodes in a tandem welding operation in a selected phase relationship. Each of the welding systems of an electrode has individual switch points accurately controlled while the systems are shifted or delayed to prevent magnetic interference between different electrodes. This allows driving of several AC electrodes using a common information network. The Houston U.S. Pat. No. 6,472,634 system is especially useful for paralleled power supplies to power a given electrode with AC current. The switch points are coordinated by an accurate interface and the weld parameter for each paralleled power supply is provided by the general information network. This background is technology developed and patented by assignee and does not necessarily constitute prior art just because it is herein used as "background."

As a feature of the system in Stava U.S. Pat. No. 6,207,929, two or more power supplies can drive a single electrode. Thus, the system comprises a first controller for a first power supply to cause the first power supply to create an AC current between the electrode and workpiece by generating a switch signal with polarity reversing switching points in general timed relationship with respect to a given system synchronizing signal received by the first controller. This first controller is operated at first welding parameters in response to a set of first power supply specific parameter signals directed to the first controller. There is provided at least one slave controller for operating the slave power supply to create an AC current between the same electrode and workpiece by reversing polarity of the AC current at switching points. The slave controller operates at second weld parameters in response to the second set of power supply specific parameter signals to the slave controller. An information network connected to the first controller and the second or slave controller contains digital first and second power supply specific parameter signals for the two controllers and the system specific synchronizing signal. Thus, the controllers receive the parameter signals and the synchronizing signal from the information network, which may be an ethernet network with or without an internet link, or merely a local area network. The invention involves a digital interface connecting the first controller and the slave controller to control the switching points of the second or slave power supply by the switch signal from the first or master controller. In practice, the first controller starts a current reversal at a switch point. This event is transmitted at high accuracy to the slave controller to start its current reversal process. When each controller senses an arc current less than a given number, a "ready signal" is created. After a "ready" signal from all paralleled power supplies, all power supplies reverse polarity. This occurs upon receipt of a strobe or look command each 25 μs. Thus, the switching is in unison and has a delay of less than 25 μs. Consequently, both of the controllers have interconnected data controlling the switching points of the AC current to the single electrode. The same controllers receive parameter information and a synchronizing signal from an information network which in practice comprises a combination of internet and ethernet or a local area ethernet network. The timing accuracy of the digital interface is less than about 10 μs and, preferably, in the general range of 1–5 μs. Thus, the switching points for the two controllers driving a single electrode are commanded within less than 5 μs. Then, switching actually occurs within 25 μs. At the same time, relatively less time sensitive information is received from the information network also connected to the two controllers driving the AC current to a single electrode in a tandem welding operation.

The 25 µs maximum delay can be changed, but is less than the switch command accuracy.

The unique control system disclosed in Houston U.S. Pat. No. 6,472,634 is used to control the power supply for tandem electrodes used primarily in pipe seam welding and disclosed in Stava U.S. Pat. No. 6,291,798. This Stava patent relates to a series of tandem electrodes movable along a welding path to lay successive welding beads in the space between the edges of a rolled pipe or the ends of two adjacent pipe sections. The individual AC waveforms used in this unique technology are created by a number of current pulses occurring at a frequency of at least 18 kHz with a magnitude of each current pulse controlled by a wave shaper. This technology dates back to Blankenship U.S. Pat. No. 5,278,390. Shaping of the waveforms in the AC currents of two adjacent tandem electrodes is known and is shown in not only the patents mentioned above, but in Stava U.S. Pat. No. 6,207,929. In this latter Stava patent, the frequency of the AC current at adjacent tandem electrodes is adjusted to prevent magnetic interference. All of these patented technologies by The Lincoln Electric Company of Cleveland, Ohio have been advances in the operation of tandem electrodes each of which is operated by a separate AC waveform created by the waveform technology set forth in these patents. These patents are incorporated by reference herein. However, these patents do not disclose the present invention which is directed to the use of such waveform technology for use in tandem welding by adjacent electrodes each using an AC current. This technology, as the normal transformer technology, has experienced difficulty in controlling the dynamics of the weld puddle. Thus, there is a need for an electric arc welding system for adjacent tandem electrodes which is specifically designed to control the dynamics and physics of the molten weld puddle during the welding operation. These advantages can not be obtained by merely changing the frequency to reduce the magnetic interference.

To control penetration by the lead electrode in tandem electric arc welding or welding system, a unique leading electrode arrangement has been used for a number of years. The initial concept involved two moving lead electrodes connected to the power source in a series so current would flow from the tip of one electrode to the tip of the adjacent electrode. Both of these electrodes were movable toward a common point at the weld puddle in the groove between the edges of the workpiece being welded. By using a series arrangement, one electrode was connected to the work terminal of the power source and the other was connected to the normal electrode terminal. All of the power was between the electrodes and not between the electrode and the workpiece. Consequently, there was essentially zero arc force. The electrodes were melted by the current flow between the electrodes. This provided a double deposition rate with a substantially reduced heat input to the weld puddle. The heat to the puddle was, thus, decreased. The disadvantage of the series electrode concept was that there was very little penetration. The arc did not extend to the workpiece. The metal was deposited into the joint between the edges of the workpiece primarily by gravity. To increase the penetration of the lead arc by the two series electrodes, the trailing electrode was also connected to machine ground. This concept is disclosed in Shutt U.S. Pat. No. 4,246,463. In this arrangement, the arc traveled between the two electrodes and from the lead electrode to the workpiece. With two 3/16 inch electrodes, the modified series arc system had the current from the lead electrode flowing through two paths back to the power source. The current either passed to the trailing electrode or to the workpiece. In practice, the ratio of current flow from the lead electrode back to the power source is approximately ⅓ through the work and ⅔ through the electrode. The work had substantially more resistance in the return parallel circuit. This arrangement doubled the deposition rate. The amount of current into the plate or workpiece was about 30% of the total current of the welding operation. Consequently, there was double deposition rate and decreased heat into the plate. Penetration was caused by the modified series circuit connection of the two lead electrodes. This single side welding of heavy workpieces has not been used extensively because the frequency of the AC current in the series connected electrodes was controlled by the line frequency of the power source. The wire feeder for each of the electrodes was controlled by the same power source. This limited the relationship of the two motors driving the wire feeders. The input voltage and frequency of the power source was used to drive both wire feeders. Consequently, using the prior art system with all of its apparent advantages could be accomplished in only a relatively small range of currents and with only certain limited electrode sizes. Thus, using the prior art system was restricted. There had to be a tuning of the current and input frequency for proper melting, penetration and wire feed speed. The parameters of the power source and the interrelationship of the two independently driven wire feeders rendered the advantageous prior welding technique of a tandem arc welder where the two electrodes are connected in series and driven by AC current to be quite limited. Since there is a limited application of this technology, it was not possible to sell series connected tandem electrode equipment for general purpose electric arc welding. Consequently, the advantages of modified series connected electrodes in a tandem welding system has essentially lay dormant through the many years of its existence.

THE INVENTION

To render universally acceptable and usable, a tandem electric arc welder or system having two lead electrodes connected in a modified series circuit, the present invention was developed. By using the present invention, large plates can be welded from one side in a submerged arc welding operation, with an arc force causing penetration while the series connected electrodes substantially increase the deposition. By using the present invention, a root weld bead is deposited by the two series connected lead electrodes. This tacks the two spaced edges of the workpiece together. In practice the large plates are ship sheet plates or the ends of pipe segments in pipe welding. This invention modifies the well known series connected lead electrode concept for tandem welding so that such a welder can be used with a large variety of currents and a large variety of electrodes, both size and material. This is a substantial advance in the electric arc welding field and solves the reason for the lack of use of the modified series connected tandem electrodes in one side, submerged arc welding. The modification can be used in other types of welding.

In accordance with the present invention, there is provided an electric arc welder for depositing weld metal along the groove between edges of a metal workpiece. The welder comprises an electrode driven by the wire feeder toward a point in the groove. A second electrode is driven by a second wire feeder toward the same point in the groove. A main power source is connected to the electrode with a first output terminal of the power source connected to the first electrode and a second output terminal of the main power source connected to both the second electrode and directly or indirectly to the metal workpiece. The welder includes two return paths, one through the second electrode and one through the workpiece. The power source includes a high speed switching output stage such as an inverter chopper. This stage creates current with a selected AC waveform between the first and second output terminals of the main power source. The waveform of the main power source is generated by a waveform generator controlling a pulse width modulator circuit normally a digital circuit, but in some instances it is an analog PWM circuit. The pulse width modulator circuit, digital or analog, determines the current operation of the output stage of the main power source. A device is used to move the electrodes in unison along the groove in a given direction. These electrodes form the lead electrodes in a tandem electrode arc welder or electric arc welding system. In accordance with the preferred embodiment of the present invention, a third, fourth or fifth electrode is connected behind the first and second series connected electrodes. Each of these following electrodes is movable with the first series connected electrodes. In practice, they are movable on the same mechanism or tractor; however, they could be moved separately and still be "generally movable" with the first and second series connected electrodes. The third or subsequent electrodes are each powered by an auxiliary power source different from the main power source, with the first output terminal connected to the third electrode and a second output terminal connected to the workpiece. This is a standard connection for the trailing electrodes of a tandem welding operation.

Still a further aspect of the present invention is the provision of an electric arc welder as defined above wherein the auxiliary power source for the tailing electrodes also includes a high speed switching output stage, such as an inverter or chopper. This output stage creates a selected trailing waveform between the first and second output terminals of the auxiliary power source. The trailing waveform of the auxiliary power source is generated by a waveform generator controlling the pulse width modulator circuit, either digital or analog, to determine the current operation of the output stage of the auxiliary power source. The number of power sources, as shown in the prior art, can vary according to the number of trailing electrodes. Indeed, one power source can operate two trailing electrodes or two power sources can operate a single trailing electrode. These are all variations used in tandem electric arc welding as defined in the various patents incorporated by reference herein.

In accordance with an aspect of the invention, the trailing waveforms of the trailing electrodes are also an AC waveform, such as used in the series connected lead electrodes of the electric welder constructed in accordance with the present invention. Of course, the trailing electrodes could have waveforms which are DC waveforms created by the waveform generator producing a steady output signal for determining the magnitude of the DC waveform. In this instance, waveform is a level of current, whereas "waveform" is used in this application primarily to mean a repeating AC waveform.

In accordance with a more limited aspect of the present invention, the main power source includes a first and second module power source connected in parallel with the output terminals of the main power source. To provide greater current, a second module is connected in parallel with a first module. The two power source modules are defined as the "main" power source driving the series connected lead electrodes of the present invention. In the preferred implementation, a second power source is connected in series between the second electrode and the workpiece. In this arrangement, one terminal of the main power source and a terminal of the second power source are connected in series and to the second electrode. The second power source is in the workpiece path. By using two power sources, the separate independently driven wire feeders for the two series connected electrodes can be controlled by different power sources. This prevents a complicated software development when a single power source is used to drive the separate two wire feeders used for the lead electrodes of the invention. Consequently, there is an advantage of using two separate power sources, with each of the power sources having a wire feed control circuit that can be adjusted to optimize the wire feeder of each of the series connected electrodes forming the lead electrodes of the tandem welding system obtained by the present invention.

The present invention is primarily used for one sided welding on large plates. In this context, the invention also includes the concept of a back plate below the groove accepting the weld metal. The back plate is on the underside of the workpiece and normally provides a trough with flux that controls the backside weld bead configuration. In accordance with an aspect, there is a flux dispenser in front of the trailing electrodes. Thus, the trailing electrodes are used for submerged arc welding. In practice, the first series electrodes are either gas shielded or provided with a flux dispenser to create a submerged arc welding process for the first two electrodes.

By using the present invention, the waveform generator for the main power source is provided with a circuit to adjust the frequency of the AC waveform between the series connected lead electrodes. In this manner, the frequency of the AC waveform used in the series connected electrodes is not dictated in any fashion by the frequency of line voltage to the main power source. By adjusting the frequency of the waveform, the welding operation for the series connected electrodes can be modulated to accommodate different diameter electrodes, electrodes with different material and a variety of currents to customize the welding operation in a manner not available in the prior art. Furthermore, the waveform generator of the present invention has a circuit for adjusting duty cycles of the AC waveforms from the main power source. Thus, the welding operation can be adjusted between penetration and deposition to customize the operation of the weld process. To accomplish this objective, the magnitude of the positive current portion of the waveform are controlled independently or as a percentage of the magnitude of the negative portion of the AC waveform. All of these adjustment circuits allow the main power source to be adjusted in frequency, duty cycle and/or amplitudes to customize the welder for providing an optimized welding process, while still employing the tremendously advantageous series connected electrodes.

The primary object of the present invention is the provision of a tandem electric arc welder wherein the lead electrodes are connected in series, which welder includes an AC current waveform in the two series connected electrodes, which waveform can be adjusted to customize the welding operation performed by the lead electrodes in the tandem electrode welder.

Another object of the present invention is the provision of an electric arc welder, as defined above, which electric arc welder can use different electrodes and different current settings to perform the AC arc welding process with the series connected lead electrodes.

Yet another object of the present invention is the provision of an electric arc welder, as defined above, which electric arc welder has the capabilities of adjusting the frequency of the waveform, the duty cycle of the waveform and/or the magnitude of the current in the positive and negative portions of the waveform so that the welding process performed by the lead series connected electrodes are customized.

These and other objects and advantages will become apparent from the following description taken together with the accompanying drawings.

PREFERRED EMBODIMENT

Figure 1:
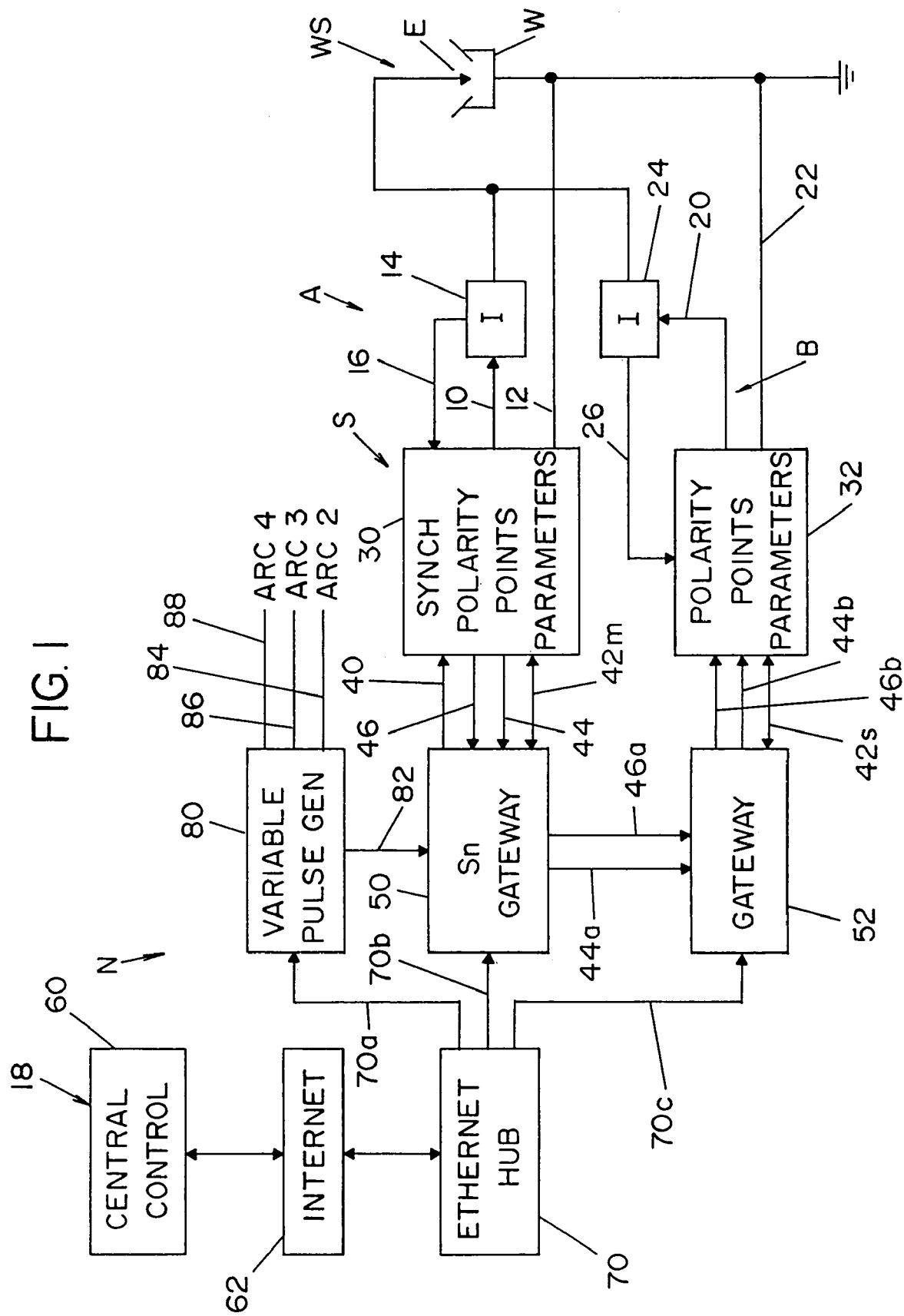
FIG. 1 is a block diagram of a welder used to practice the present invention.
Figure 2:
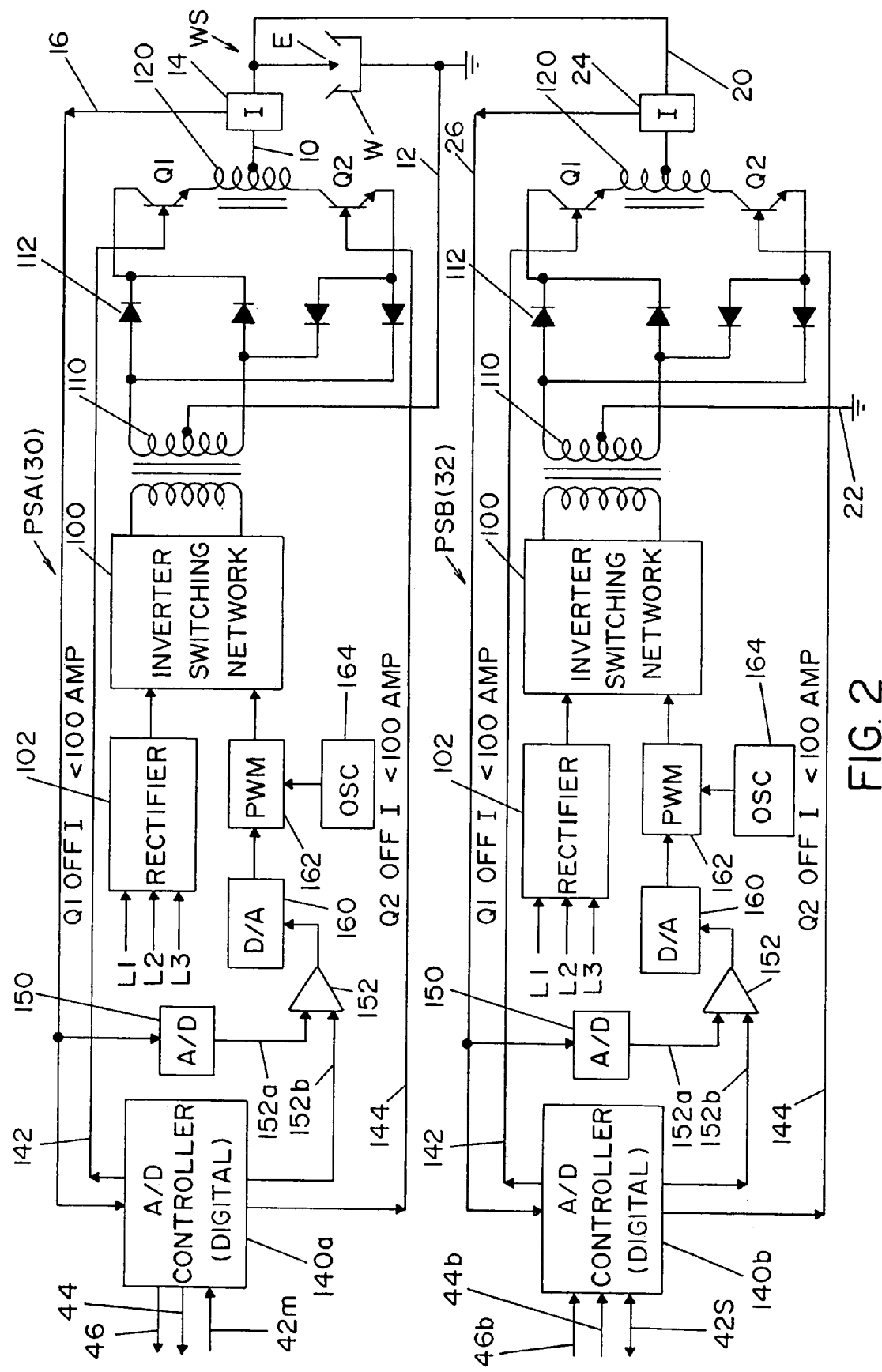
FIG. 2 is a wiring diagram of two paralleled power supplies, each of which include a switching output which power supplies.
Figure 16:
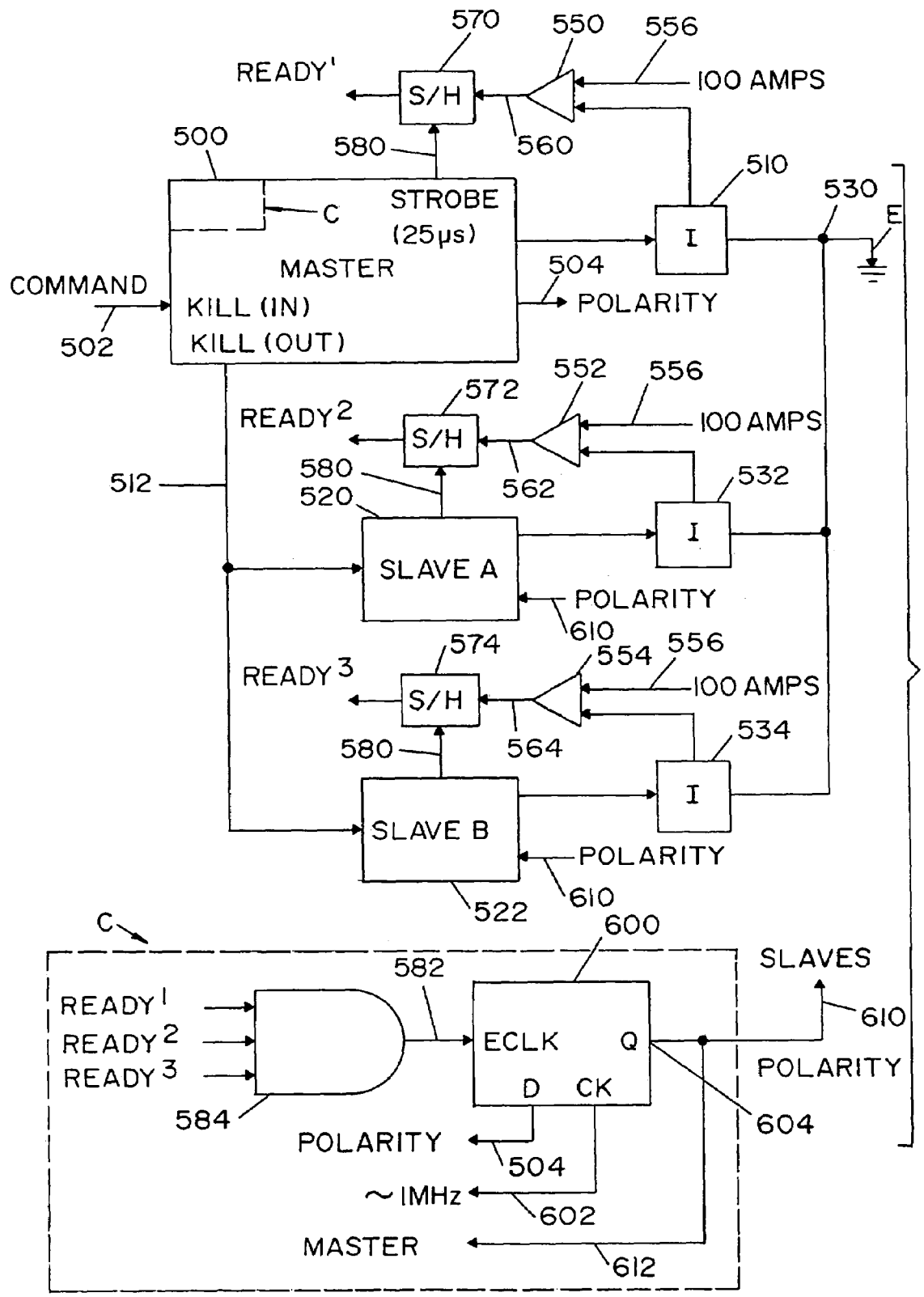
FIG. 16 is a schematic layout of the software program to cause switching of the paralleled power supplies as soon as the coordinated switch commands have been processed and the next coincident signal has been created.

Referring now to the drawings wherein the showings are for the purpose of illustrating a preferred embodiment of the invention only and not for the purpose of limiting same, the system used in practicing the invention is shown in detail in FIGS. 1, 2 and 16. In FIG. 1 there is a single electric arc welding system S in the form of a single cell to create an alternating current as an arc at weld station WS. This system or cell includes a first master welder A with output leads 10, 12 in series with electrode E and workpiece W in the form of a pipe seam joint or other welding operation. Hall effect current transducer 14 provides a voltage in line 16 proportional to the current of welder A. Less time critical data, such as welding parameters, are generated at a remote central control 18. In a like manner, a slave following welder B includes leads 20, 22 connected in parallel with leads 10, 12 to direct an additional AC current to the weld station WS. Hall effect current transducer 24 creates a voltage in line 26 representing current levels in welder B during the welding operation. Even though a single slave or follower welder B is shown, any number of additional welders can be connected in parallel with master welder A to produce an alternating current across electrode E and workpiece W. The AC current is combined at the weld station instead of prior to a polarity switching network. Each welder includes a controller and inverter based power supply illustrated as a combined master controller and power supply 30 and a slave controller and power supply 32. Controllers 30,32 receive parameter data and synchronization data from a relatively low level logic network. The parameter information or data is power supply specific whereby each of the power supplies is provided with the desired parameters such as current, voltage and/or wire feed speed. A low level digital network can provide the parameter information; however, the AC current for polarity reversal occurs at the same time. The "same" time indicates a time difference of less than 10 μs and preferably in the general range of 1–5 μs. To accomplish precise coordination of the AC output from power supply 30 and power supply 32, the switching points and polarity information can not be provided from a general logic network wherein the timing is less precise. The individual AC power supplies are coordinated by high speed, highly accurate DC logic interface referred to as "gateways." As shown in FIG. 1, power supplies 30, 32 are provided with the necessary operating parameters indicated by the bi-directional leads 42m, 42s, respectively. This non-time sensitive information is provided by a digital network shown in FIG. 1. Master power supply 30 receives a synchronizing signal as indicated by unidirectional line 40 to time the controllers operation of its AC output current. The polarity of the AC current for power supply 30 is outputted as indicated by line 46. The actual switching command for the AC current of master power supply 30 is outputted on line 44. The switch command tells power supply S, in the form of an inverter, to "kill," which is a drastic reduction of current. In an alternative, this is actually a switch signal to reverse polarity. The "switching points" or command on line 44 preferably is a "kill" and current reversal commands utilizing the "switching points" as set forth in Stava U.S. Pat. No. 6,111,216.

Figure 5:
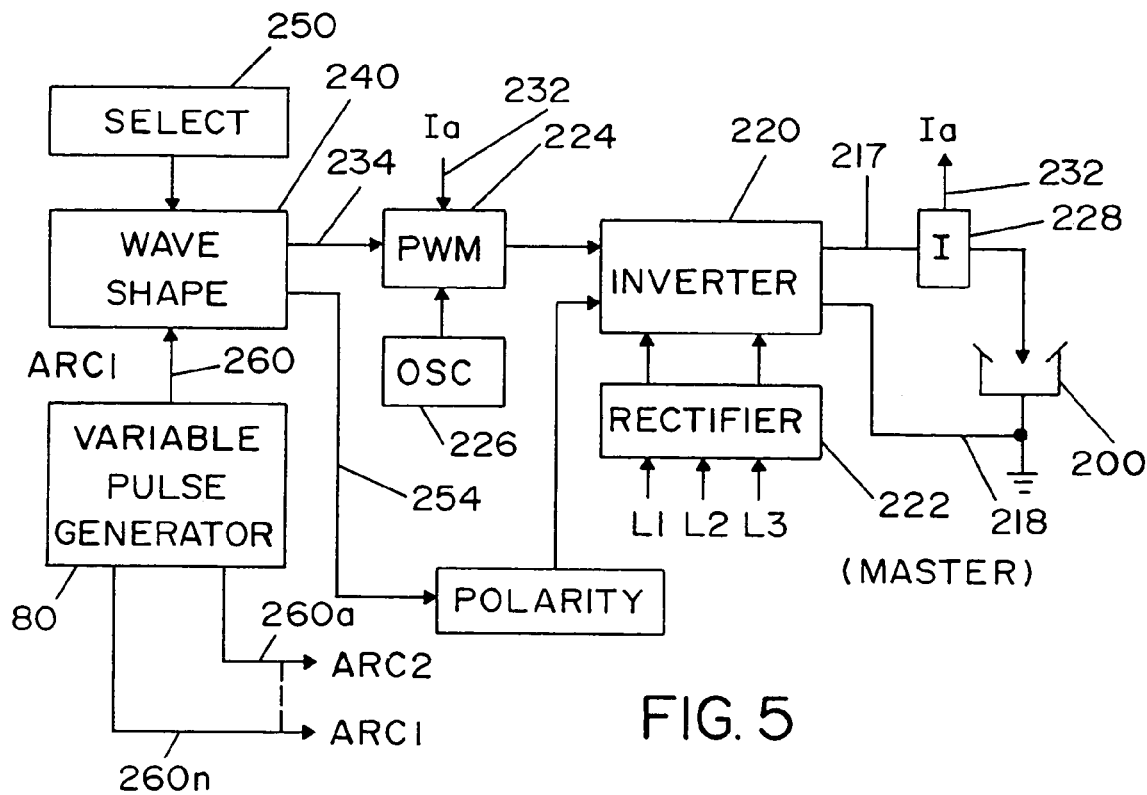
FIG. 5 is a block diagram showing a single electrode driven by the system as shown in FIG. 4 with a variable pulse generator disclosed in Houston U.S. Pat. No. 6,472,634.

Thus, timed switching points or commands are outputted from power supply 30 by line 44. These switching points or commands may involve a power supply "kill" followed by a switch ready signal at a low current or merely a current reversal point. The switch "ready" is used when the "kill" concept is implemented because neither inverters are to actually reverse until they are below the set current. This is described in FIG. 16. The polarity of the switches of controller 30 controls the logic on line 46. Slave power supply 32 receives the switching point or command logic on line 44*b* and the polarity logic on line 46*b*. These two logic signals are interconnected between the master power supply and the slave power supply through the highly accurate logic interface shown as gateway 50, the transmitting gateway, and gateway 52, the receiving gateway on lines 44*a*, 46*a*. These gateways are network interface cards for each of the power supplies so that the logic on lines 44*b*, 46*b* are timed closely to the logic on lines 44, 46, respectively. In practice, network interface cards or gateways 50, 52 control this logic to within 10 μs and preferably within 1–5 μs. A low accuracy network controls the individual power supplies for data from central control 18 through lines 42*m*, 42*s*, illustrated as provided by the gateways or interface cards. These lines contain data from remote areas (such as central control 18) which are not time sensitive and do not use the accuracy characteristics of the gateways. The highly accurate data for timing the switch reversal uses interconnecting logic signals through network interface cards 50, 52. The system in FIG. 1 is a single cell for a single AC arc; however, the invention is directed to tandem electrodes wherein two or more AC arcs are created to fill the large gap found in pipe welding. Thus, the master power supply 30 for the first electrode receives a synchronization signal which determines the timing or phase operation of the system S for a first electrode, i.e. ARC 1. System S is used with other identical systems to generate ARCs 2, 3, and 4 timed by synchronizing outputs 84, 86 and 88. This concept is schematically illustrated in FIG. 5. The synchronizing or phase setting signals 82–88 are shown in FIG. 1 with only one of the tandem electrodes. An information network N comprising a central control computer and/or web server 60 provides digital information or data relating to specific power supplies in several systems or cells controlling different electrodes in a tandem operation. Internet information 62 is directed to a local area network in the form of an ethernet network 70 having local interconnecting lines 70*a*, 70*b*, 70*c*. Similar interconnecting lines are directed to each power supply used in the four cells creating ARCs 1, 2, 3 and 4 of a tandem welding operation. The description of system or cell S applies to each of the arcs at the other electrodes. If AC current is employed, a master power supply is used. In some instances, merely a master power supply is used with a cell specific synchronizing signal. If higher currents are required, the systems or cells include a master and slave power supply combination as described with respect to system S of FIG. 1. In some instances, a DC arc is used with two or more AC arcs synchronized by generator 80. Often the DC arc is the leading electrode in a tandem electrode welding operation, followed by two or more synchronized AC arcs. A DC power supply need not be synchronized, nor is there a need for accurate interconnection of the polarity logic and switching points or commands. Some DC powered electrodes maybe switched between positive and negative, but not at the frequency of an AC driven electrode. Irrespective of the make-up of the arcs, ethernet or local area network 70 includes the parameter information identified in a coded fashion designated for specific power supplies of the various systems used in the tandem welding operation. This network also employs synchronizing signals for the several cells or systems whereby the systems can be offset in a time relationship. These synchronizing signals are decoded and received by a master power supply as indicated by line 40 in FIG. 1. In this manner, the AC arcs are offset on a time basis. These synchronizing signals are not required to be as accurate as the switching points through network interface cards or gateways 50, 52. Synchronizing signals on the data network are received by a network interface in the form of a variable pulse generator 80. The generator creates offset synchronizing signals in lines 84, 86 and 88. These synchronizing signals dictate the phase of the individual alternating current cells for separate electrodes in the tandem operation. Synchronizing signals can be generated by interface 80 or actually received by the generator through the network 70. In practice, network 70 merely activates generator 80 to create the delay pattern for the many synchronizing signals. Also, generator 80 can vary the frequency of the individual cells by frequency of the synchronizing pulses if that feature is desired in the tandem welding operation.

A variety of controllers and power supplies could be used for practicing the system as described in FIG. 1; however, preferred implementation of the system is set forth in FIG. 2 wherein power supply PSA is combined with controller and power supply 30 and power supply PSB is combined with controller and power supply 32. These two units are essentially the same in structure and are labeled with the same numbers when appropriate. Description of power supply PSA applies equally to power supply PSB. Inverter 100 has an input rectifier 102 for receiving three phase line current L1, L2, and L3. Output transformer 110 is connected through an output rectifier 112 to tapped inductor 120 for driving opposite polarity switches Q1, Q2. Controller 140*a* of power supply PSA and controller 140*b* of PSB are essentially the same, except controller 140*a* outputs timing information to controller 140*b*. Switching points or lines 142, 144 control the conductive condition of polarity switches Q1, Q2 for reversing polarity at the time indicated by the logic on lines 142, 144, as explained in more detail in Stava U.S. Pat. No. 6,111,216 incorporated by reference herein. The control is digital with a logic processor; thus, A/D converter 150 converts the current information on feedback line 16 or line 26 to controlling digital values for the level of output from error amplifier 152 which is illustrated as an analog error amplifier. In practice, this is a digital system and there is no further analog signal in the control architecture. As illustrated, however, amplifier has a first input 152*a* from converter 150 and a second input 152*b* from controller 140*a* or 140*b*. The current command signal on line 152*b* includes the wave shape or waveform required for the AC current across the arc at weld station WS. This is standard practice as taught by several patents of Lincoln Electric, such as Blankenship U.S. Pat. No. 5,278,390, incorporated by reference. See also Stava U.S. Pat. No. 6,207,929, incorporated by reference. The output from amplifier 152 is converted to an analog voltage signal by converter 160 to drive pulse width modulator 162 at a frequency controlled by oscillator 164, which is a timer program in the processor software. The shape of the waveform at the arcs is the voltage or digital number at lines 152*b*. The frequency of oscillator 164 is greater than 18 kHz. The total architecture of this system is digitized in the preferred embodiment of the present invention and does not include reconversion back into analog signal. This representation is schematic for illustrative purposes and is not intended to be limiting of the type of power supply used in practicing the present invention. Other power supplies could be employed.

Figure 3:
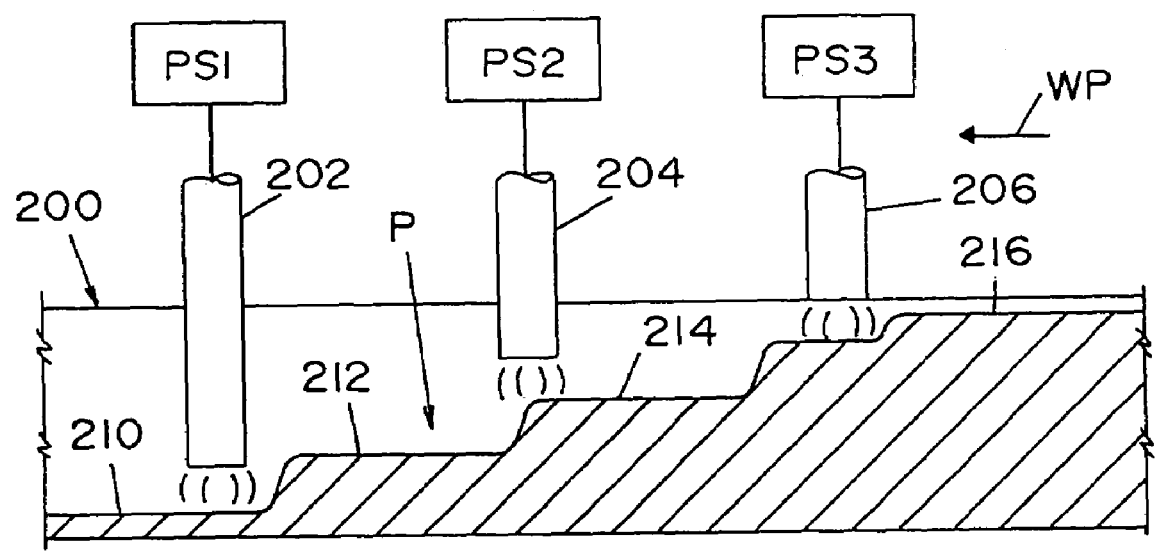
FIG. 3 is a cross sectional side view of three tandem electrodes for welding the seam of a pipe.
Figure 4:
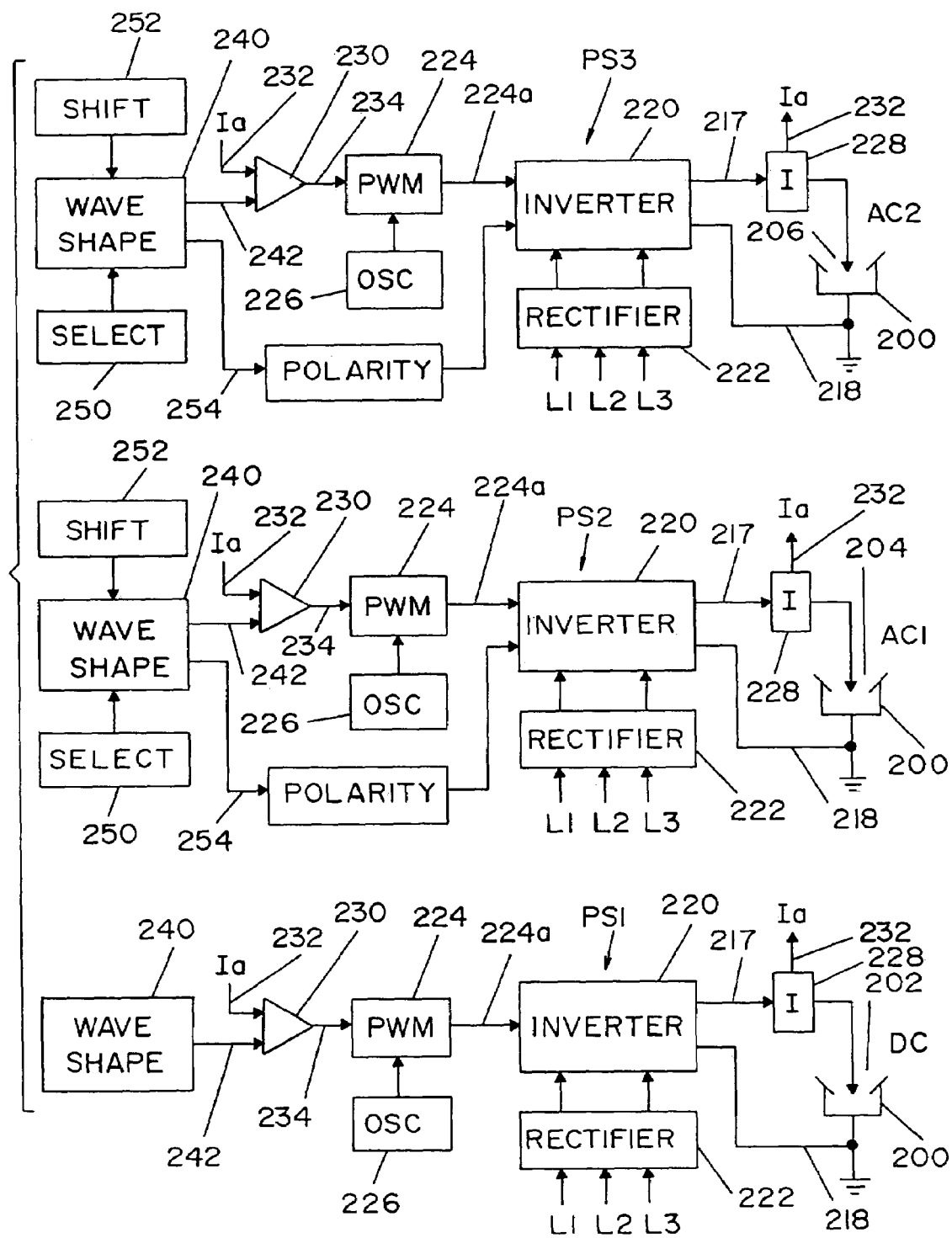
FIG. 4 is a schematic layout in block form of a welding system for three electrodes using the disclosure in Houston U.S. Pat. No. 6,472,634 and Stava U.S. Pat. No. 6,291,798.
Figure 7:
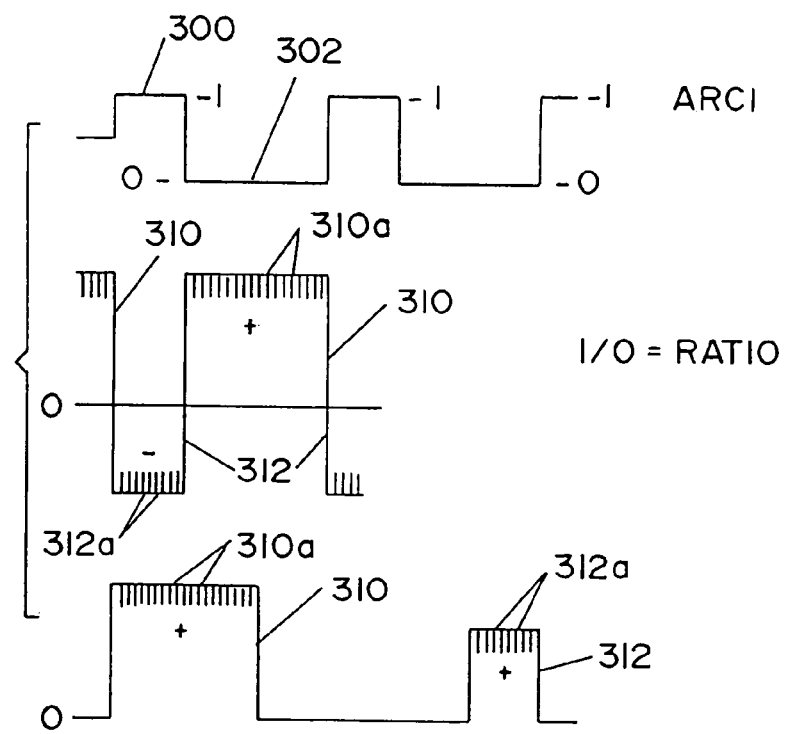
FIG. 7 is a current graph superimposed upon a signal having logic to determine the polarity of the waveform as used in practicing the present invention.

The practice of the present invention utilizing the concepts of FIGS. 1 and 2 are illustrated in FIGS. 3 and 4. Workpiece 200 is a seam in a pipe which is welded together by tandem electrodes 202, 204 and 206 powered by individual power supplies PS1, PS2, PS3, respectively. The power supplies can include more than one power source coordinated in accordance with the technology in Houston U.S. Pat. No. 6,472,634. The illustrated embodiment involves a DC arc for lead electrode 202 and an AC arc for each of the tandem electrodes 204, 206. The created waveforms of the tandem electrodes are AC currents and include shapes created by a wave shaper or wave generator in accordance with the previously described waveform technology. As electrodes 202, 204 and 206 are moved along weld path WP a molten metal puddle P is deposited in pipe seam 200 with an open root portion 210 followed by deposits 212, 214 and 216 from electrodes 202, 204 and 206, respectively. As previously described more than two AC driven electrodes as will be described and illustrated by the waveforms of FIG. 15, can be operated by the invention relating to AC currents of adjacent electrodes. The power supplies, as shown in FIG. 4, each include an inverter 220 receiving a DC link from rectifier 222. In accordance with Lincoln waveform technology, a chip or internal programmed pulse width modulator stage 224 is driven by an oscillator 226 at a frequency greater than 18 kHz and preferably greater than 20 kHz. As oscillator 226 drives pulse width modulator 224, the output current has a shape dictated by the wave shape outputted from wave shaper 240 as a voltage or digital numbers at line 242. Output leads 217, 218 are in series with electrodes 202, 204 and 206. The shape in real time is compared with the actual arc current in line 232 from Hall Effect transducer 228 by a stage illustrated as comparator 230 so that the outputs on line 234 controls the shape of the AC waveforms. The digital number or voltage on line 234 determines the output signal on line 224a to control inverter 220 so that the waveform of the current at the arc follows the selected profile outputted from wave shaper 240. This is standard Lincoln waveform technology, as previously discussed. Power supply PS1 creates a DC arc at lead electrode 202; therefore, the output from wave shaper 240 of this power supply is a steady state indicating the magnitude of the DC current. The present invention does not relate to the formation of a DC arc. To the contrary, the present invention is the control of the current at two adjacent AC arcs for tandem electrodes, such as electrodes 204, 206. In accordance with the invention, wave shaper 240 involves an input 250 employed to select the desired shape or profile of the AC waveform. This shape can be shifted in real time by an internal programming schematically represented as shift program 252. Wave shaper 240 has an output which is a priority signal on line 254. In practice, the priority signal is a bit of logic, as shown in FIG. 7. Logic 1 indicates a negative polarity for the waveform generated by wave shaper 240 and logic 0 indicates a positive polarity. This logic signal or bit controller 220 directed to the power supply is read in accordance with the technology discussed in FIG. 16. The inverter switches from a positive polarity to a negative polarity, or the reverse, at a specific "READY" time initiated by a change of the logic bit on line 254. In practice, this bit is received from variable pulse generator 80 shown in FIG. 1 and in FIG. 5. The welding system shown in FIGS. 3 and 4 is used in practicing the invention wherein the shape of AC arc currents at electrodes 204 and 206 have novel shapes to obtain a beneficial result of the present invention, i.e. a generally quiescent molten metal puddle P and/or synthesized sinusoidal waveforms compatible with transformer waveforms used in arc welding. The electric arc welding system shown in FIGS. 3 and 4 have a program to select the waveform at "SELECT" program 250 for wave shaper 240. In this manner the unique waveforms of the present invention are used by the tandem electrodes. One of the power supplies to create an AC arc is schematically illustrated in FIG. 5. The power supply or source is controlled by variable pulse generator 80, shown in FIG. 1. Signal 260 from the generator controls the power supply for the first arc. This signal includes the synchronization of the waveform together with the polarity bit outputted by the wave shaper 240 on line 254. Lines 260a–260n control the desired subsequent tandem AC arcs operated by the welding system of the present invention. The timing of these signals shifts the start of the other waveforms. FIG. 5 merely shows the relationship of variable pulse generator 80 to control the successive arcs as explained in connection with FIG. 4.

Figure 6:
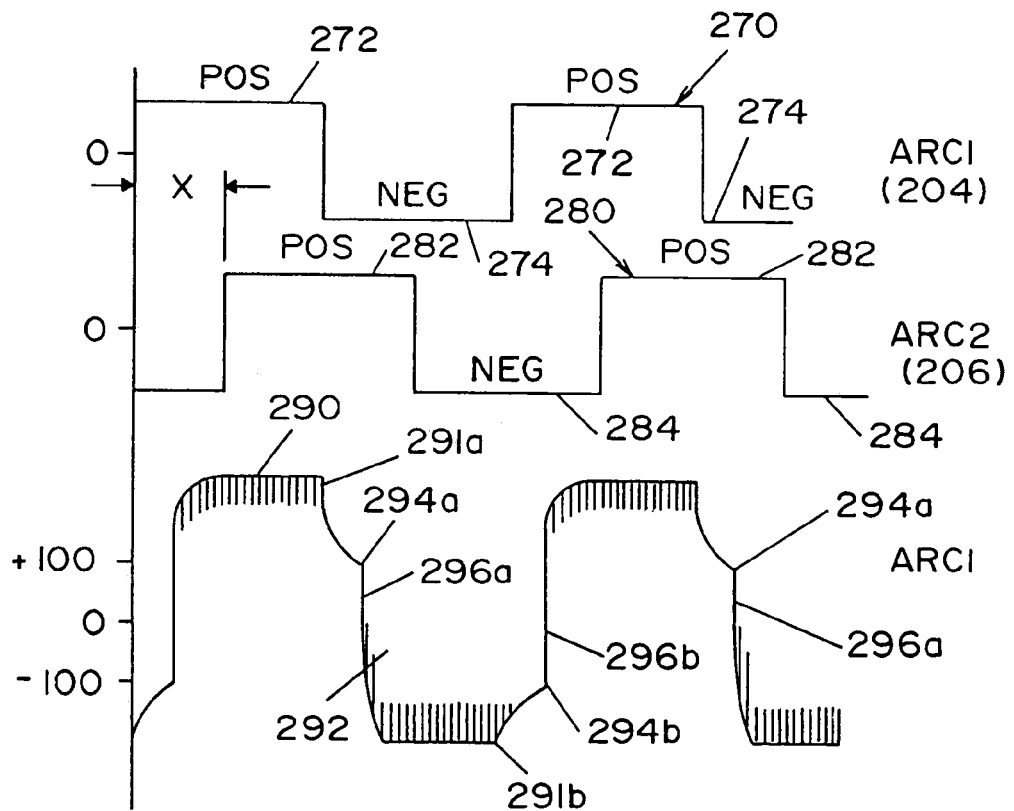
FIG. 6 is a current graph for one of two illustrated synchronizing pulses and showing a balanced AC waveform for one tandem electrode.
Figure 8:
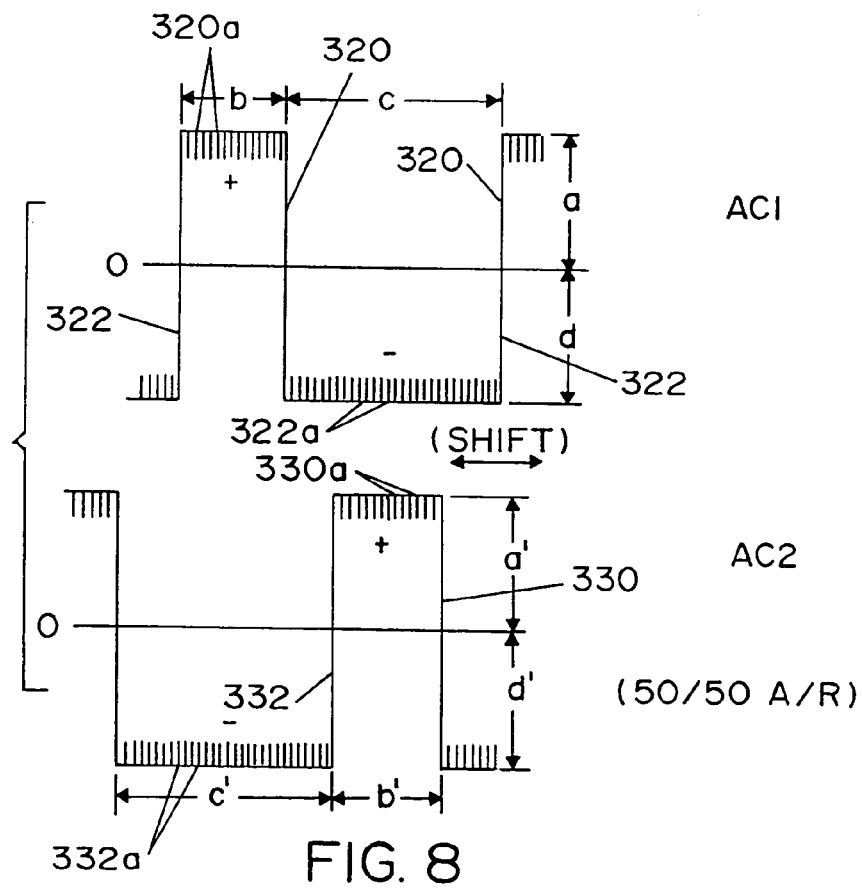
FIG. 8 is a current graph showing a broad aspect of waveforms used in the preferred embodiment of the present invention.
Figure 9:
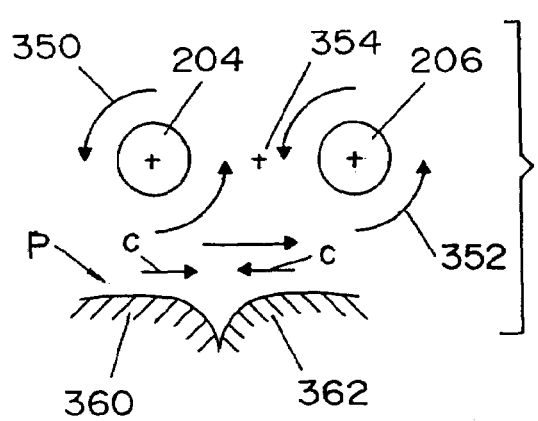
FIGS. 9 and 10 are schematic drawings illustrating the dynamics of the weld puddle during concurrent polarity relationships of tandem electrodes.
Figure 10:
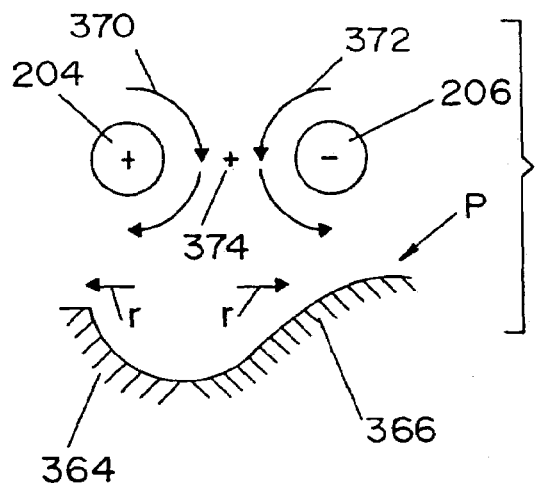

In the welding system of Houston U.S. Pat. No. 6,472,634, the AC waveforms are created as shown in FIG. 6 wherein the wave shaper for arc AC1 at electrode 204 creates a signal 270 having positive portions 272 and negative portions 274. The second arc AC2 at electrode 206 is controlled by signal 280 from the wave shaper having positive portions 282 and negative portions 284. These two signals are the same, but are shifted by the signal from generator 80 a distance x, as shown in FIG. 6. The waveform technology created current pulses or waveforms at one of the arcs are waveforms having positive portions 290 and negative portions 292 shown at the bottom portion of FIG. 6. A logic bit from the wave shaper determines when the waveform is switched from the positive polarity to the negative polarity and the reverse. In accordance with the disclosure in Stava U.S. Pat. No. 6,111,216 (incorporated by reference herein) pulse width modulator 224 is generally shifted to a lower level at point 291a and 291b. Then the current reduces until reaching a fixed level, such as 100 amps. Consequently, the switches change polarity at points 294a and 294b. This produces a vertical line or shape 296a, 296b when current transitioning between positive portion 290 and negative portion 292. This is the system disclosed in the Houston patent where the like waveforms are shifted to avoid magnetic interference. The waveform portions 290, 292 are the same at arc AC1 and at arc AC2. This is different from the present invention which relates to customizing the waveforms at arc AC1 and arc AC2 for purposes of controlling the molten metal puddle and/or synthesizing a sinusoidal wave shape in a manner not heretofore employed. The disclosure of FIG. 6 is set forth to show the concept of shifting the waveforms, but not the invention which is customizing each of the adjacent waveforms. The same switching procedure to create a vertical transition between polarities is used in the preferred embodiment of the present invention. Converting from the welding system shown in FIG. 6 to the present invention is generally shown in FIG. 7. The logic on line 254 is illustrated as being a logic 1 in portions 300 and a logic 0 in portions 302. The change of the logic or bit numbers signals the time when the system illustrated in FIG. 16 shifts polarity. This is schematically illustrated in the lower graph of FIG. 6 at points 294a, 294b. In accordance with the invention, wave shaper 240 for each of the adjacent AC arcs has a first wave shape 310 for one of the polarities and a second wave shape 312 for the other polarity. Each of the waveforms 310, 312 are created by the logic on line 234 taken together with the logic on line 254. Thus, pulses 310, 312 as shown in FIG. 7, are different pulses for the positive and negative polarity portions. Each of the pulses 310, 312 are created by separate and distinct current pulses 310a, 312a as shown. Switching between polarities is accomplished as illustrated in FIG. 6 where the waveforms generated by the wave shaper are shown as having the general shape of waveforms 310, 312. Positive polarity controls penetration and negative polarity controls deposition. In accordance with the invention, the positive and negative pulses of a waveform are different and the switching points are controlled so that the AC waveform at one arc is controlled both in the negative polarity and the positive polarity to have a specific shape created by the output of wave shaper 240. The waveforms for the arc adjacent to the arc having the current shown in FIG. 7 is controlled differently to obtain the advantages of the present invention. This is illustrated best in FIG. 8. The waveform at arc AC 1 is in the top part of FIG. 8. It has positive portions 320 shown by current pulses 320a and negative portions 322 formed by pulses 322a. Positive portion 320 has a maximum magnitude a and width or time period b. Negative portion 322 has a maximum magnitude d and a time or period c. These four parameters are adjusted by wave shaper 240. In the illustrated embodiment, arc AC2 has the waveform shown at the bottom of FIG. 8 where positive portion 330 is formed by current pulses 330a and has a height or magnitude a' and a time length or period b'. Negative portion 332 is formed by pulses 332a and has a maximum amplitude b' and a time length c'. These parameters are adjusted by wave shaper 240. In accordance with the invention, the waveform from the wave shaper on arc AC1 is out of phase with the wave shape for arc AC2. The two waveforms have parameters or dimensions which are adjusted so that (a) penetration and deposition is controlled and (b) there is no long time during which the puddle P is subjected to a specific polarity relationship, be it a like polarity or opposite polarity. This concept in formulating the wave shapes prevents long term polarity relationships as explained by the showings in FIGS. 9 and 10. In FIG. 9 electrodes 204, 206 have like polarity, determined by the waveforms of the adjacent currents at any given time. At that instance, magnetic flux 350 of electrode 204 and magnetic flux 352 of electrode 206 are in the same direction and cancel each other at center area 354 between the electrodes. This causes the molten metal portions 360, 362 from electrodes 204, 206 in the molten puddle P to move together, as represented by arrows c. This inward movement together or collapse of the molten metal in puddle P between electrodes 204 will ultimately cause an upward gushing action, if not terminated in a very short time, i.e. less than about 20 ms. As shown in FIG. 10, the opposite movement of the puddle occurs when the electrodes 204, 206 have opposite polarities. Then, magnetic flux 370 and magnetic flux 372 are accumulated and increased in center portion 374 between the electrodes. High forces between the electrodes causes the molten metal portions 364, 366 of puddle P to retract or be forced away from each other. This is indicated by arrows r. Such outward forcing of the molten metal in puddle P causes disruption of the weld bead if it continues for a substantial time which is generally less than 10 ms. As can be seen from FIGS. 9 and 10, it is desirable to limit the time during which the polarity of the waveform at adjacent electrodes is either the same polarity or opposite polarity. As shown in FIG. 8, like polarity and opposite polarity is retained for a very short time less than the cycle length of the waveforms at arc AC1 and arc AC2. This positive development of preventing long term occurrence of polarity relationships together with the novel concept of pulses having different shapes and different proportions in the positive and negative areas combine to control the puddle, control penetration and control deposition in a manner not heretofore obtainable in welding with a normal transformer power supplies or normal use of Lincoln waveform technology.

Figure 11:
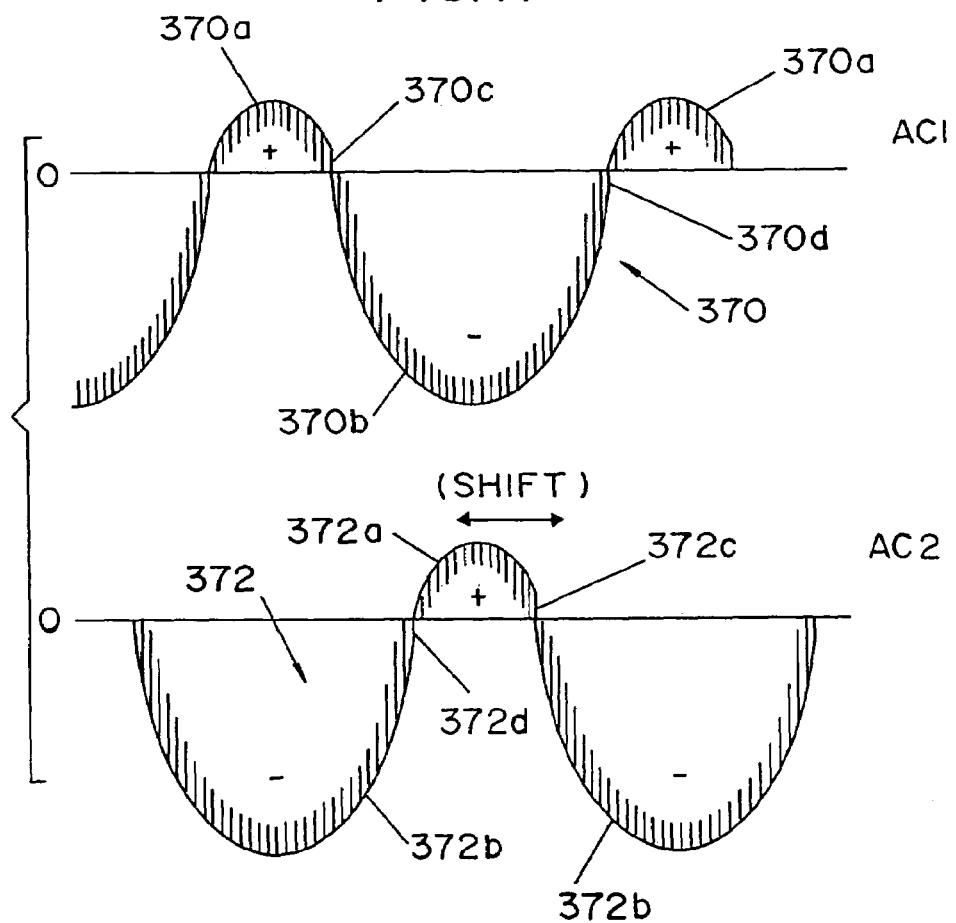
FIG. 11 is a pair of current graphs showing the waveforms on two adjacent tandem electrodes.

In FIG. 11 the positive and negative portions of the AC waveform from the wave shaper 240 are synthesized sinusoidal shapes with a different energy in the positive portion as compared to the negative portion of the waveforms. The synthesized sine wave or sinusoidal portions of the waveforms is novel. It allows the waveforms to be compatible with transformer welding circuits and compatible with evaluation of sine wave welding. In FIG. 11, waveform 370 is at arc AC1 and waveform 372 is at arc AC2. These tandem arcs utilize the AC welding current shown in FIG. 11 wherein a small positive sinusoidal portion 370a controls penetration at arc AC1 while the larger negative portion 370b controls the deposition of metal at arc AC1. There is a switching between the polarities with a change in the logic bit, as discussed in FIG. 7. Sinusoidal waveform 370 plunges vertically from approximately 100 amperes through zero current as shown in by vertical line 370c. Transition between the negative portion 370b and positive portion 370a also starts a vertical transition at the switching point causing a vertical transition 370d. In a like manner, phase shifted waveform 372 of arc AC2 has a small penetration portion 372a and a large negative deposition portion 372b. Transition between polarities is indicated by vertical lines 372c and 372d. Waveform 372 is shifted with respect to waveform 370 so that the dynamics of the puddle are controlled without excessive collapsing or repulsion of the molten metal in the puddle caused by polarities of adjacent arcs AC1, AC2. In the embodiment shown in FIG. 11, the sine wave shapes are the same and the frequencies are the same. They are merely shifted to prevent a long term occurrence of a specific polarity relationship.

Figure 12:
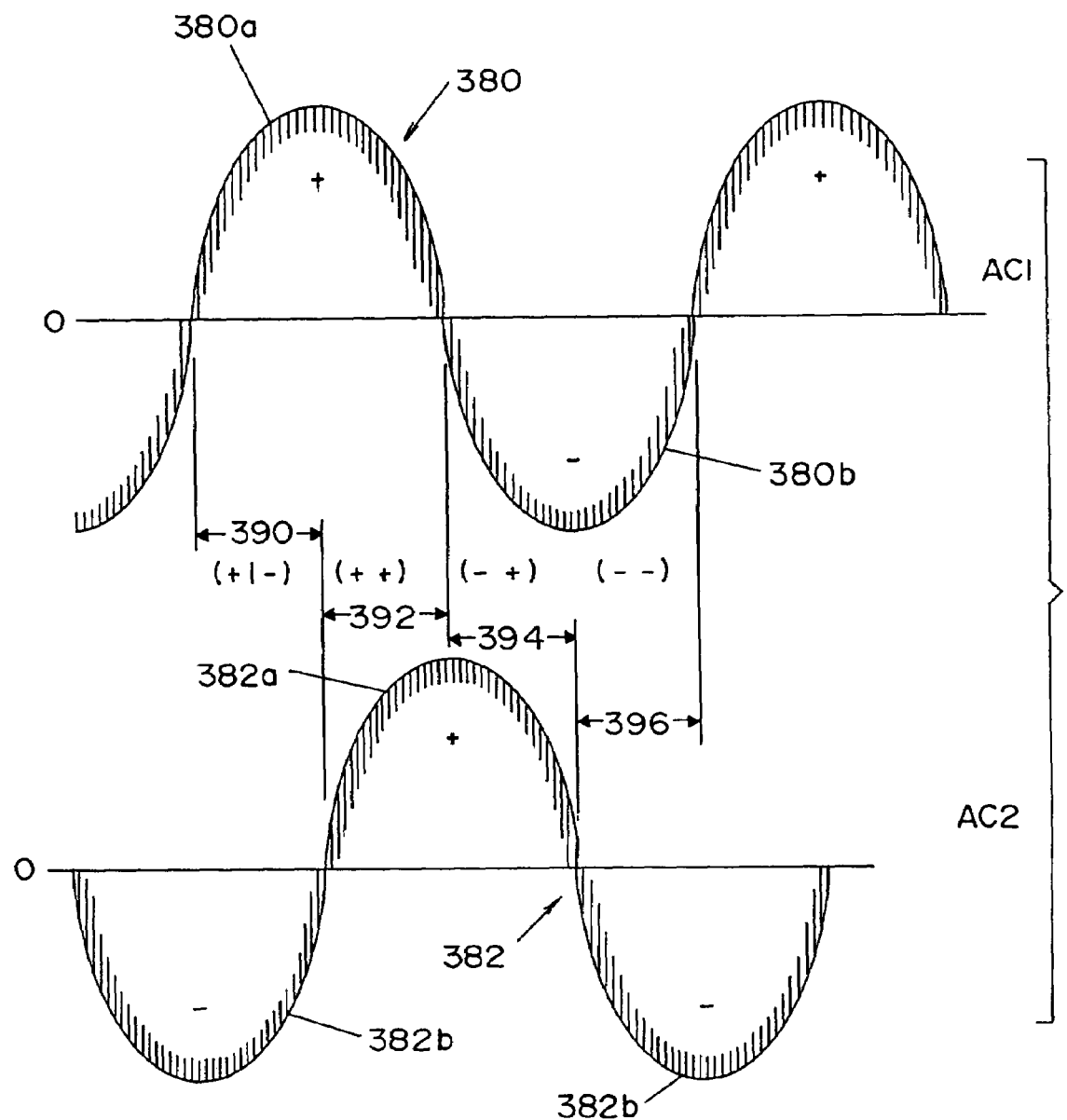
FIG. 12 is a pair of current graphs of the AC waveforms on adjacent tandem electrodes with areas of concurring polarity relationships.
Figure 13:
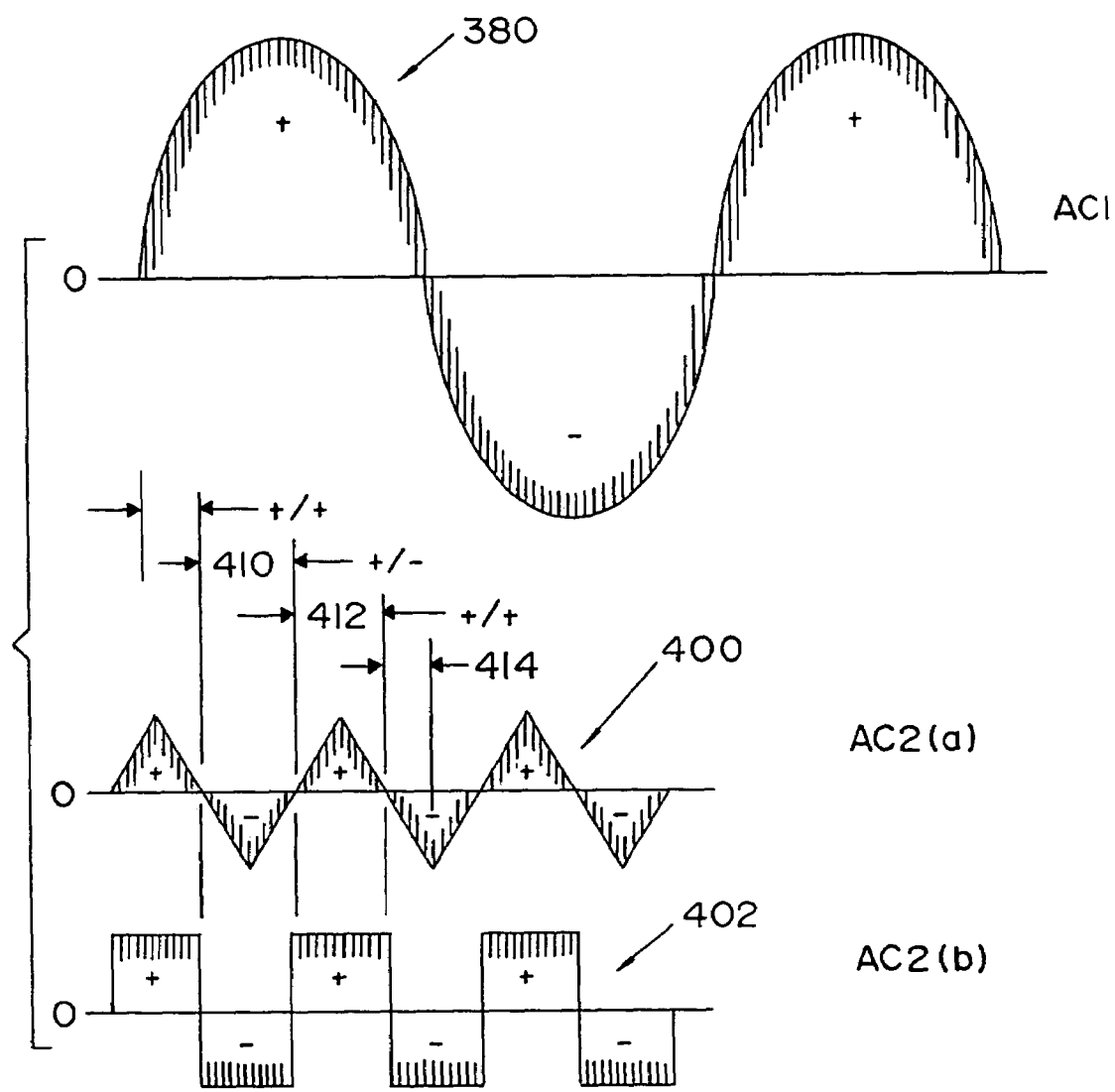
FIG. 13 are current graphs of the waveforms on adjacent tandem electrodes wherein the AC waveform of one electrode is substantially different waveform of the other electrode to limit the time of concurrent polarity relationships.
Figure 14:
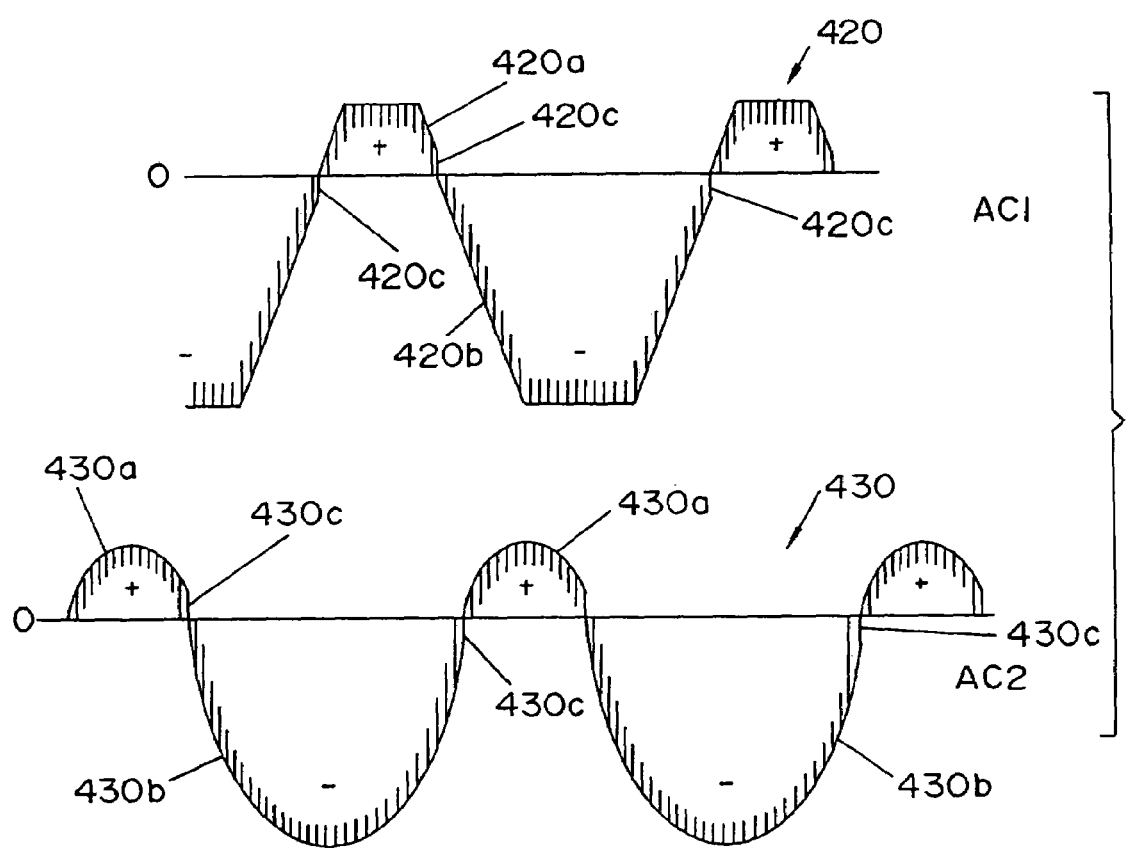
FIG. 14 are current graphs of two sinusoidal waveforms for adjacent electrodes to use different shaped wave forms for the adjacent tandem electrodes.

In FIG. 12 waveform 380 is used for arc AC1 and waveform 382 is used for arc AC2. Portions 380a, 380b, 382a, and 382b are sinusoidal synthesized and are illustrated as being of the same general magnitude. By shifting these two waveforms 90°, areas of concurrent polarity are identified as areas 390, 392, 394 and 396. By using the shifted waveforms with sinusoidal profiles, like polarities or opposite polarities do not remain for any length of time. Thus, the molten metal puddle is not agitated and remains quiescent. This advantage of the concept of a difference in energy between the positive and negative polarity portions of a given waveform. FIG. 12 is illustrative in nature to show the definition of concurrent polarity relationships and the fact that they should remain for only a short period of time. To accomplish this objective, another embodiment of the present invention is illustrated in FIG. 13 wherein previously defined waveform 380 is combined with waveform 400, shown as the sawtooth waveform of arc AC2(*a*) or the pulsating waveform 402 shown as the waveform for arc AC2(*b*). Combining waveform 380 with the different waveform 400 of a different waveform 402 produces very small areas or times of concurrent polarity relationships 410, 412, 414, etc. In FIG. 14 the AC waveform generated at one arc drastically different than the AC waveform generated at the other arc. This same concept of drastically different waveforms is illustrated in FIG. 14 wherein waveform 420 is an AC pulse profile waveform and waveform 430 is a sinusoidal profile waveform having about one-half the period of waveform 420. Waveform 420 includes a small penetration positive portion 420a and a large deposition portion 420b with straight line polarity transitions 420c. Waveform 430 includes positive portion 430a and negative portion 430b with vertical polarity transitions 430c. By having these two different waveforms, both the synthesized sinusoidal concept is employed for one electrode and there is no long term concurrent polarity relationship. Thus, the molten metal in puddle P remains somewhat quiescent during the welding operation by both arcs AC1, AC2.

Figure 15:
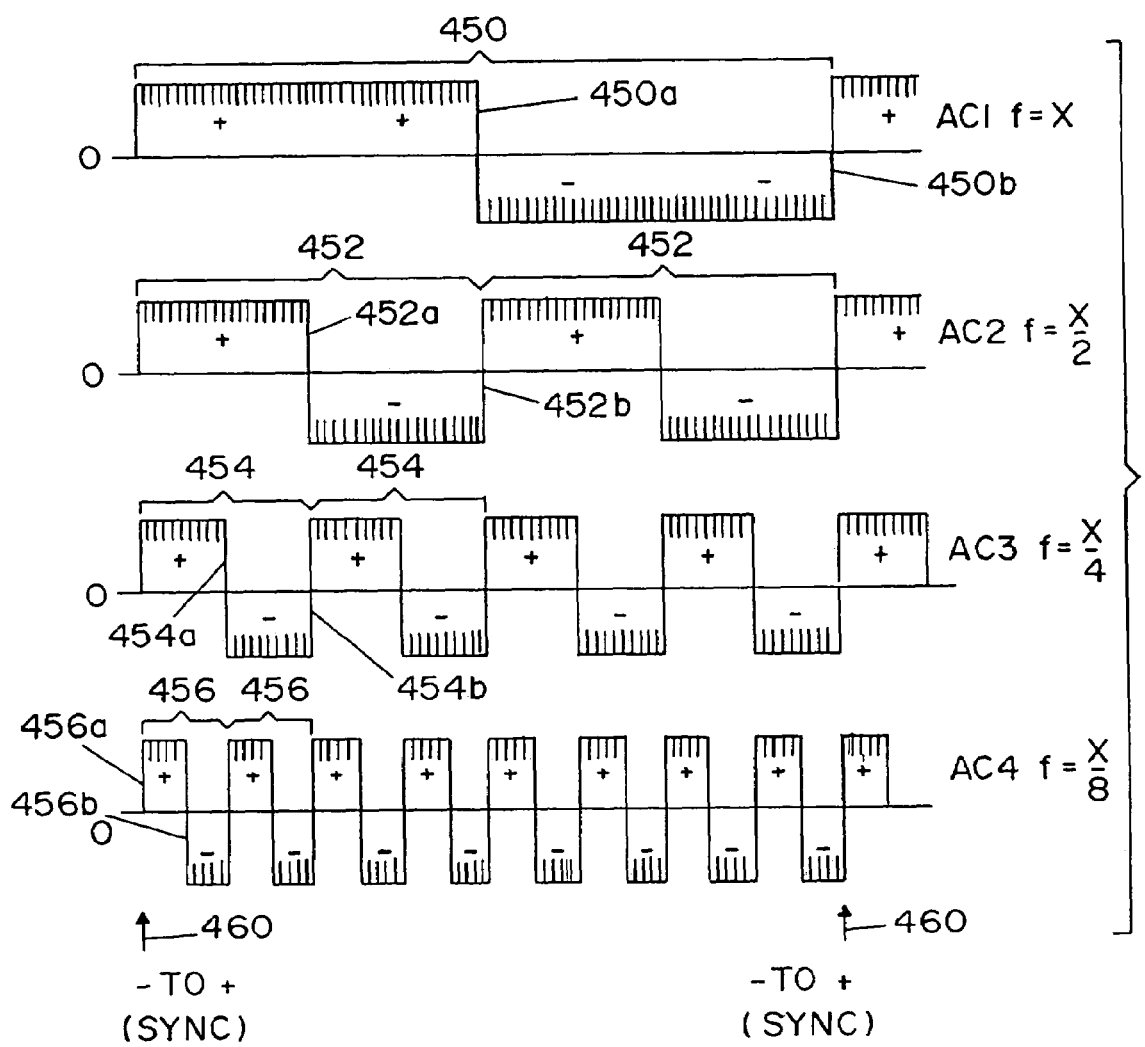
FIG. 15 are current graphs showing waveforms at four adjacent AC arcs of tandem electrodes shaped and synchronized in accordance with the welder constructed in accordance with the invention.

In FIG. 15 waveforms 450, 452, 454 and 456 are generated by the wave shaper 240 of the power supply for each of four tandem arcs, arc AC1, arc AC2, arc AC3 and arc AC4. The adjacent arcs are aligned as indicated by synchronization signal 460 defining when the waveforms correspond and transition from the negative portion to the positive portion. This synchronization signal is created by generator 80 shown in FIG. 1, except the start pulses are aligned. In this embodiment of the invention first waveform 450 has a positive portion 450a, which is synchronized with both the positive and negative portion of the adjacent waveform 452, 454 and 456. For instance, positive portion 450a is synchronized with and correlated to positive portion 452a and negative portion 452b of waveform 452. In a like manner, the positive portion 452a of waveform 452 is synchronized with and correlated to positive portion 454a and negative portion 454b of waveform 454. The same relationship exist between positive portion 454a and the portions 456a, 456b of waveform 456. The negative portion 450b is synchronized with and correlated to the two opposite polarity portions of aligned waveform 452. The same timing relationship exist between negative portion 452b and waveform 454. In other words, in each adjacent arc one polarity portion of the waveform is correlated to a total waveform of the adjacent arc. In this manner, the collapse and repelling forces of puddle P, as discussed in connection with FIGS. 9 and 10, are dynametically controlled. One or more of the positive or negative portions can be synthesized sinusoidal waves as discussed in connection with an aspect of the invention disclosed in FIGS. 11 and 12.

As indicated in FIGS. 1 and 2, when the master controller of switches is to switch, a switch command is issued to master controller 140a of power supply 30. This causes a "kill" signal to be received by the master so a kill signal and polarity logic is rapidly transmitted to the controller of one or more slave power supplies connected in parallel with a single electrode. If standard AC power supplies are used with large snubbers in parallel with the polarity switches, the slave controller or controllers are immediately switched within 1–10 µs after the master power supply receives the switch command. This is the advantage of the high accuracy interface cards or gateways. In practice, the actual switching for current reversal of the paralleled power supplies is not to occur until the output current is below a given value, i.e. about 100 amperes. This allows use of smaller switches.

The implementation of the switching for all power supplies for a single AC arc uses the delayed switching technique where actual switching can occur only after all power supplies are below the given low current level. The delay process is accomplished in the software of the digital processor and is illustrated by the schematic layout of FIG. 16. When the controller of master power supply 500 receives a command signal as represented by line 502, the power supply starts the switching sequence. The master outputs a logic on line 504 to provide the desired polarity for switching of the slaves to correspond with polarity switching of the master. In the commanded switch sequence, the inverter of master power supply 500 is turned off or down so current to electrode E is decreased as read by hall effect transducer 510. The switch command in line 502 causes an immediate "kill" signal as represented by line 512 to the controllers of paralleled slave power supplies 520, 522 providing current to junction 530 as measured by hall effect transducers 532,534. All power supplies are in the switch sequence with inverters turned off or down. Software comparator circuits 550, 552, 554 compare the decreased current to a given low current referenced by the voltage on line 556. As each power supply decreases below the given value, a signal appears in lines 560, 562, and 564 to the input of a sample and hold circuits 570, 572, and 574, respectively. The circuits are outputted by a strobe signal in line 580 from each of the power supplies. When a set logic is stored in a circuit 570, 572, and 574, a YES logic appears on lines READY$^1$, READY$^2$, and READY$^3$ at the time of the strobe signal. This signal is generated in the power supplies and has a period of 25 µs; however, other high speed strobes could be used. The signals are directed to controller C of the master power supply, shown in dashed lines in FIG. 16. A software ANDing function represented by AND gate 584 has a YES logic output on line 582 when all power supplies are ready to switch polarity. This output condition is directed to clock enable terminal ECLK of software flip flop 600 having its D terminal provided with the desired logic of the polarity to be switched as appearing on line 504. An oscillator or timer operated at about 1 MHz clocks flip flop by a signal on line 602 to terminal CK. This transfers the polarity command logic on line 504 to a Q terminal 604 to provide this logic in line 610 to switch slaves 520, 522 at the same time the identical logic on line 612 switches master power supply 500. After switching, the polarity logic on line 504 shifts to the opposite polarity while master power supply awaits the next switch command based upon the switching frequency. Other circuits can be used to effect the delay in the switching sequence; however, the illustration in FIG. 16 is the present scheme.

The present application relates to the waveforms controlled by a wave shaper or waveform generator of an electric arc power supply including a single power source or multiple power sources correlated as disclosed in Houston U.S. Pat. No. 6,472,634 or Stava U.S. Pat. No. 6,291,798. The invention relates to tandem electrodes powered by an AC waveform. The two adjacent electrodes have waveforms that control the dynamics of the molten metal puddle between the electrodes and/or uses synthesized sine waves to correlate the operation of the tandem welding system with standard transformer welding operations. Different energy in the positive portion and negative portion controls the relationship of the amount of penetration to the amount of deposition by a particular electrode. This allows operation of adjacent electrodes in a manner to maintain the weld puddle generally quiescent. This action improves the resulting weld bead and the efficiency of the welding operation. To control the weld puddle, adjacent waveforms generated by the wave shaper have different shapes to control the length of time during which a given polarity relationship exist between the adjacent electrodes. In other words, the time that the waveforms of adjacent electrodes have like polarity or opposite polarity is limited by using different shapes and different relationships between the two adjacent AC waveforms generated by the waveform technology using a wave shaper or waveform generator.

Figure 17:
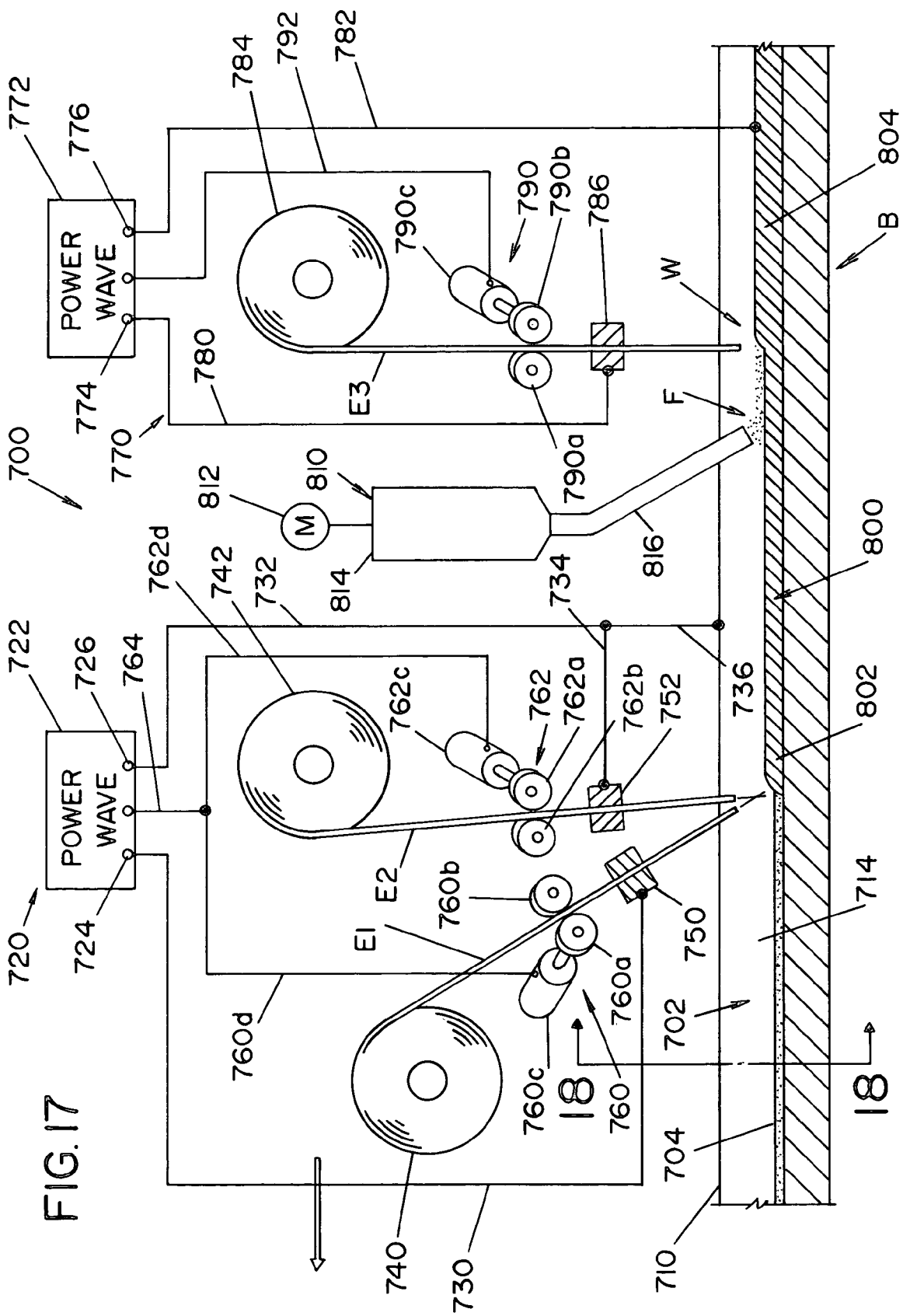
FIG. 17 is a schematic view of the general architecture of the preferred embodiment of the present invention.
Figure 20:
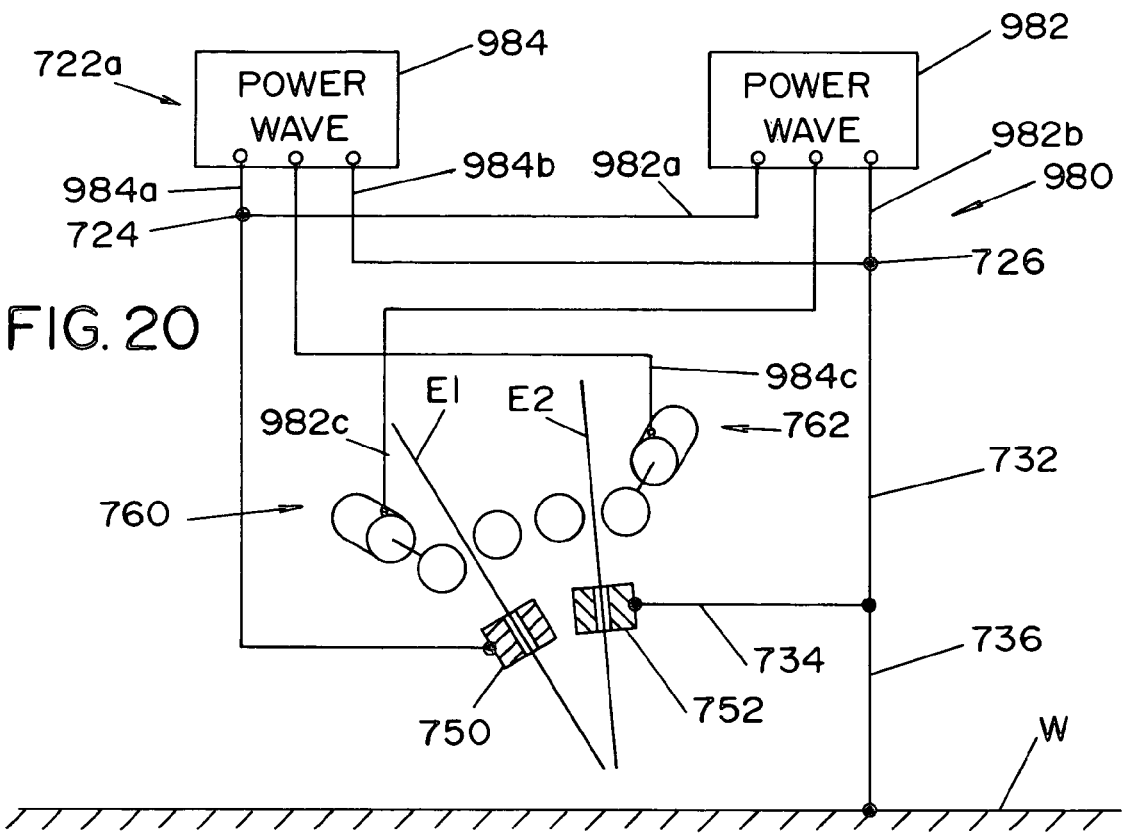
FIG. 20 is a partial side elevational view of the preferred embodiment of the present invention illustrating only the lead series connected electrode used in the present invention with a modification of the main power source; and, FIG. 21 is a view similar to FIG. 20 showing the preferred embodiment and practical embodiment now used for the main power source and the workpiece path of the present invention.
Figure 21:
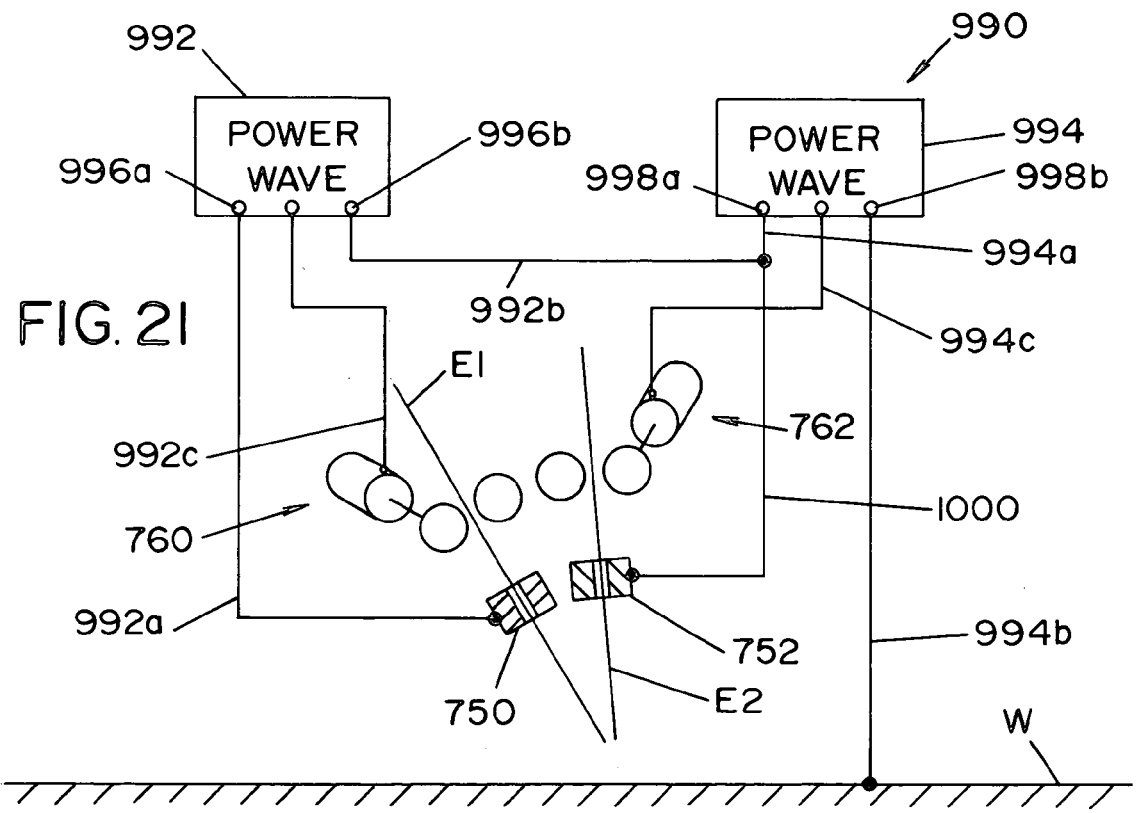

As so far described, the technology used in practicing the present invention is explained in detail. The technology in FIGS. 1–16 is employed in the preferred embodiment of the present invention. The invention involves an electric arc welder schematically illustrated in FIGS. 17 and 18 and involves tandem electric arc welding wherein first electrode E1 and second electrode E2 are connected in modified series. The subsequent electrodes, one of which is illustrated as electrode E3, are driven in unison with electrodes E1 and E2 and perform a tandem welding process. Of course, several trailing electrodes E3 are normally used. Only one trailing electrode E3 is illustrated and the same disclosure relates to the other anticipated trailing electrodes. The technology described in FIGS. 1–16 is applicable to electric arc welder 700 used to deposit metal in groove 702 of workpiece W. In the illustrated embodiment, the workpiece W is spaced plates 710, 712 with a small gap b where edges 714, 716 define trough 704 in plate B having an angle 718, best shown in FIG. 18. Electrodes E1, E2 are arranged, as shown in FIG. 17, and are directed toward a point in groove 704, best shown in FIG. 18. This point is below the electrical contact 750 and defines a stickout h. Referring now more specifically to FIG. 17, mechanism 720 drives lead electrodes E1, E2 along groove 702 and includes a main power source 722, with output terminals 724, 726 to direct AC current by way of leads 730, 732 to the respective electrodes E1, E2. The electrodes are supplied from spool 740, 742, respectively, and are driven through contacts 750, 752 by standard wire feeders 760, 762, respectively. Wire feeder 760 includes drive rolls 760a, 760b rotated by a motor 760c. In a like manner, wire feeder 762 includes drive rolls 762a, 762b rotated by motor 762c. Leads 760d and 762d are both powered by a control signal in line 764 from main power source 722. The power source is a Power Wave unit sold by The Lincoln Electric Company of Cleveland, Ohio and is generally disclosed in Blankenship U.S. Pat. No. 5,278,390. Power source 722 is used to control both wire feeders 760, 762. This results in a limitation, since a single signal is available from the power source to drive the wire feeder. When this occurs, the signal on line 764 must be a compromise signal between the desired wire feed speed of electrodes E1, E2. In practice, the single signal on line 764 drives both wire feeders. Of course, software could be developed for providing separate controls for the individual wire feeders at a substantial cost. Separate signals for the wire feeder are created when using two power sources, as shown in FIGS. 20 and 21. Lead 732 is connected to contact 752 by line 734 and to workpiece W by line 736. Thus, current flow between electrode E1 and power source 722 is through a low resistance line 734 and a higher resistance line 736. The resistance of these return paths divides the current flow to adjust the heat in the arc and penetration by the arc force in the welding process. By using the mechanism 720, high deposition by using two series electrodes is accomplished at low heat. A limited amount of current flows from electrode E1 into the workpiece during the welding operation. This welding process is controllable in accordance with the present invention, by the circuit schematically illustrated in FIG. 19.

In accordance with the preferred embodiment of the invention, electrodes E1, E2 are trailed by at least one electrode E3, shown in FIG. 17. This trailing electrode is driven by mechanism 770 in unison with electrodes E1, E2 even though they may be moved by different mechanisms. In the preferred embodiment, the same moving device is used for mechanisms 720, 770. The trailing electrode mechanism includes auxiliary power source 772 which is also a Power Wave unit manufactured by The Lincoln Electric Company of Cleveland, Ohio. This power source has output terminals 774, 776 for directing an AC current waveform by way of lines 780, 782 to use electrode E3 in a welding process. Electrode E3 is supplied by spool 784 and is driven through contact 786 by wire feeder 790, similar to wire feeders 760, 762. Wire feeder 790 has spaced drive rolls 790a, 790b rotated by a motor 790. A control signal from power source 772 in line 792 drives motor 790c to feed electrode E3 toward workpiece W at a speed determined by the signal in line 792.

Figure 18:
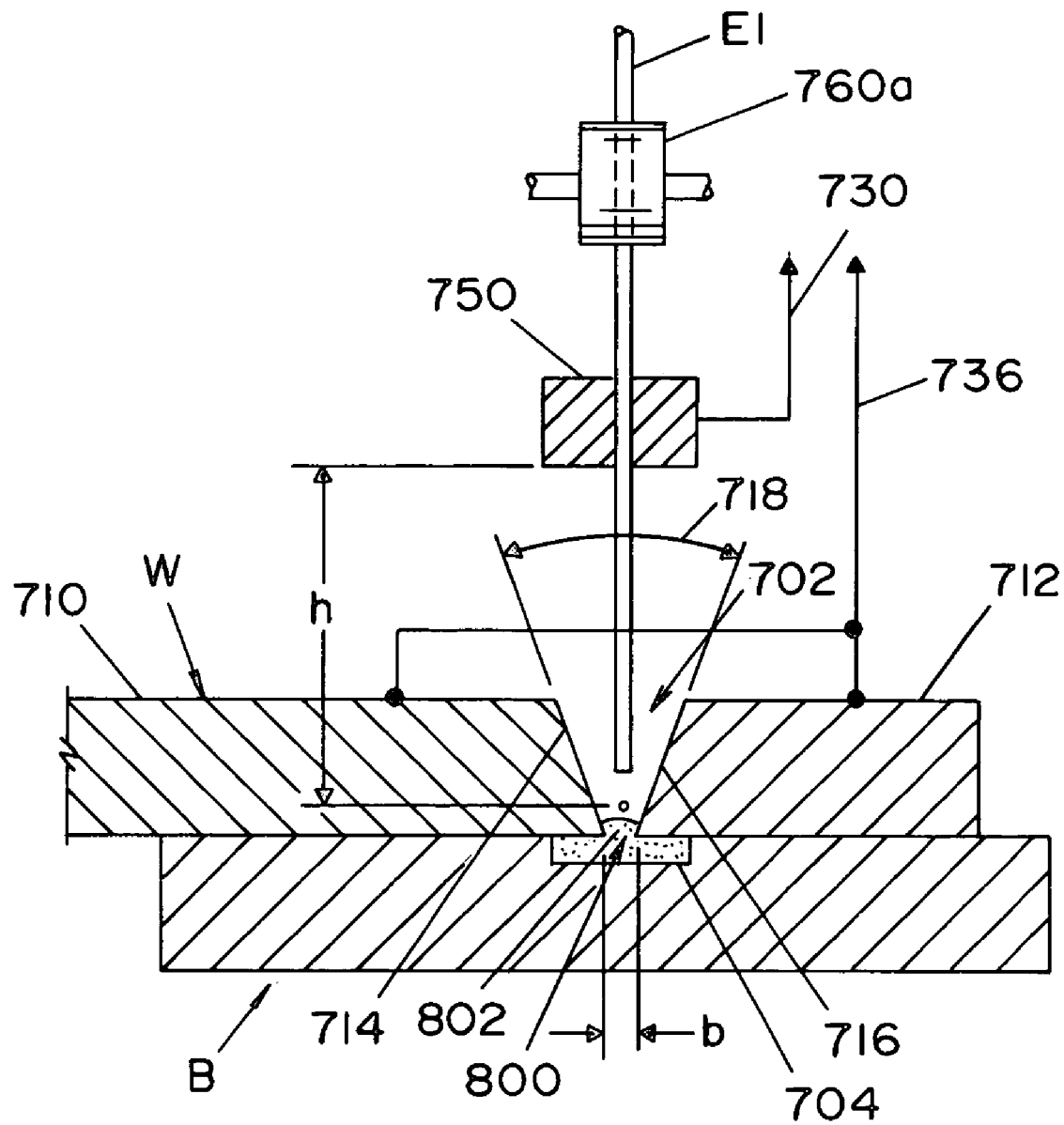
FIG. 18 is a partial cross-sectional view taken generally along line 18—18 of FIG. 17.

In operation of the preferred embodiment illustrated in FIGS. 17 and 18, electrodes E1, E2 and trailing electrode E3 create a weld puddle 800 in groove 702. Electrodes E1, E2 create a first root pass 802, which bead joins or tacks edges 714, 716 together by melting the inwardly projecting portion of groove 702. Thereafter, puddle 800 is enlarged by overlaying bead 804 by trailing electrode E3. In practice, further electrodes are used to fill groove 702 in a tandem welding process disclosed in FIGS. 1–16. In practice, electrode E3 is used in a submerged arc welding process utilizing a flux dispenser 810 in front of electrode E3 and having a dispensing motor 812 for dispensing flux F from hopper 814 through tube 816 in accordance with standard submerged welding technology. Of course, electrode E1, E2 also are used in a submerged arc AC welding process. A similar flux dispenser 810 is then provided above groove 702 in front of electrode E1. In practice, a shielding gas has also been employed around electrodes E1, E2. The present invention utilizes a power wave power source for the main power source 722 and for the auxiliary power source 772. These power sources are digitally controlled and utilize a waveform technology pioneered by The Lincoln Electric Company whereby the power sources create waveforms that comprise a series of individual current pulses created at a high switching speed in excess of 18 kHz and preferably substantially greater than 20 kHz. In practice, the waveforms are provided by a series of current pulses created at a rate of over 40 kHz. In this manner, the AC current of mechanism 720 and mechanism 770 are provided with any AC waveform to optimize the welding process for the lead electrodes as well as the trailing electrodes. This type of welding process is schematically illustrated in FIG. 19, which represents the power source used in practicing the preferred embodiment of the present invention.

Figure 19:
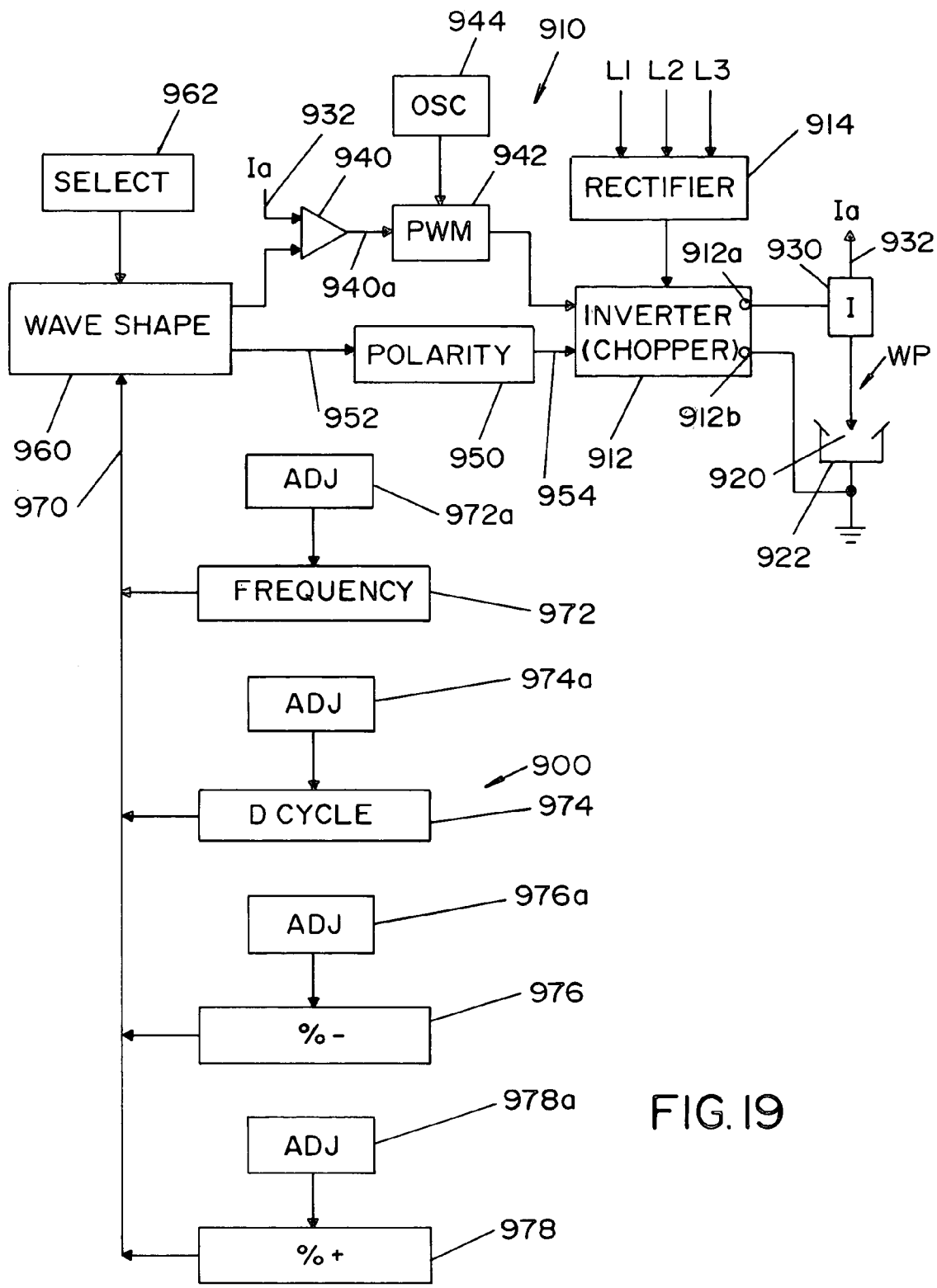
FIG. 19 is a schematic layout of the software program, together with a block diagram schematically illustrating the operation of the main power source used in the preferred embodiment of the present invention.

System 900 of the present invention is schematically illustrated in FIG. 19 wherein a Power Wave power source 910 has a high switching output stage 912 with an input rectifier 914 for receiving three phase line current L1, L2, and L3, and output terminals 912a and 912b. Output stage 912 creates an AC waveform at output terminals 912a, 9112b to perform an AC arc welding process at weld station WP illustrated as including electrode 920 and workpiece 922 and having a current shunt 930 to output a signal in line 932. This signal represents the current of the welding process being performed at weld station WP. Comparator 940 receives the signal on line 932 and has an output 940a with a voltage controlling pulse width modulator circuit 942, which can be digital or analog and has a variety of configurations. The pulse width modulator is driven at high speed by oscillator 944 which, in practice, operates at a frequency of about 40 kHz. This frequency of the oscillator driving the pulse width modulator and provides a series of current pulses at a high speed switching rate to create an AC waveform at station WP. The polarity of the waveform is controlled by the logic or signal from network 950 having an input line 952 from waveform generator 960 and an output line 954 for controlling the polarity of the waveform outputted from stage 912 of the Power Wave power source unit. The profile of the waveform comprising a series of rapidly created pulses is controlled and dictated by waveform generator 960 having a select network 962 which selects the desired waveform to be created at output terminals 912a, 912b of stage 912. By the selected waveform from network 962, the desired waveform is created for use by the electric arc welding mechanisms 720 and 770. In accordance with the invention, the waveform between electrodes E1, E2 is adjusted as shown in system 900. The waveform of the trailing electrode, illustrated as electrode E3, is controlled by the circuits illustrated and discussed with respect to FIGS. 1–16. To control the waveform used for the series connected electrodes E1, E2, system 900 includes waveform adjusting circuits 972–978, each having adjusting networks 972a–978a. Circuit 972 adjusts the frequency of the waveform. After the waveform is selected by network 962, a signal from circuit 972 adjusts the frequency of the AC waveform. In a like manner, the duty cycle of the waveform is controlled by circuit 974. Duty cycle is the relative time the waveform is in the positive polarity compared to the time in the negative polarity. Circuits 976 and 978 control the magnitude of the current during the negative portion of the waveform or the positive portion of the waveform. Circuit 976 is to adjust the magnitude of the negative portion of the waveform. Circuit 978 adjusts the magnitude of the positive portion of the waveform. The waveform used for electrodes E1, E2 is an AC wave form. However, a DC waveform could be used for a trailing electrode E3, although AC current is preferred. Indeed, it is preferred to use an AC waveform for all electrodes of electric arc welder 700. Other circuits have been used to adjust the signal on line 970 to modulate and change the profile of the wave shape selected by network 962 to optimize welding at the intersection of electrodes E1, E2.

To increase the amount of current available for the welder shown in FIG. 17 using the system shown in FIG. 19, a modified electric arc welder 980 is shown in FIG. 20. Only the leading series connected electrodes E1, E2 are illustrated; however, trailing electrodes E3 would be employed in welder 980. The welder is used to obtain more welding current by forming main power source 722 into a modified power source 722a including two separate Power Wave units 982, 984. These units are connected in parallel to double the current capacity. Output leads 982a, 982b are connected to terminals 724, 726, respectively. Output leads 984a, 984b are also connected to terminals 724, 726, respectively. Thus, welder 980 operates as welder 700 shown in FIGS. 17 and 18 by using system 900 shown in FIG. 19. By using parallel power sources, the available current is increased, without increasing the capacity of the individual power source. Furthermore, modules 982, 984 generate their own wire feeder control signals in lines 982c, 984c, respectively. Thus, wire feeders 760, 762 are controlled by separately adjustable signals available in each of the two power sources 982 and 984. Thus, the individual wire feed speed of electrodes E1, E2 are adjusted using welder 980. A similar modification of the preferred embodiment illustrated in FIGS. 17–19 is schematically illustrated in FIG. 21 which shows tandem electrode welder 990 including a main power source 992 and a second power source 994. The main power source 992 has output terminals 996a and 996b. These terminals are connected to leads 992a and 992b, respectively. Lead 992a connects the one output of power source 992 to contact 750 of electrode E1. Line 992b is connected to line 1000 for current flow in a path to and from contact E2. To connect terminal 996b in the path of the workpiece ground, second power source 994 is connected in series between terminal 996b and workpiece W. Power source 994 has terminals 998a, 998b. In this manner, second power source 994 is in series with the lead 994b connected to terminal 998b. In this architecture, electrode E1 carries full current and the current to and from electrode E1 is divided between electrode E2 and lead 994b. This is like the architecture of FIG. 16. However, lead 994a from terminal 998a is connected to lead 992b from power source 992. Consequently, the two power sources 992 and 994 are connected in series between the ground 994b and lead 992a. Between the two power sources, lead 1000 is connected to contact 752 of electrode E2. Consequently, electrodes E1 and E2 are in series with a ground current path through Power Wave power source 994. By using this arrangement, the waveforms used for both power source 992 and 994 are the same and are each created by a system 900 as shown in FIG. 19. Adjustments are made to the waveform process by power source 994 to control the current flowing in the ground path of the welder shown in FIG. 21. Since two separate power sources are employed, wire feeder 760 is controlled by the signal on line 992c from power source 992. A second wire feeder signal in line 994c is controlled by power source 994. As discussed with respect to the welder shown in FIG. 20, welder 990 has the advantage of being able to control wire feeders 760, 762 separately without complex software in the power source digital control section. In essence, FIG. 20 shows a main power source with two parallel modules. In FIG. 21 series connected modules are used; however, the second module is connected in series with the ground line to better control the current waveform in the ground return circuit or path.

The various technology concepts in FIGS. 1–16 can be applied to the welder shown in FIGS. 16–21 and the various concepts in these latter mentioned welders can be incorporated into each other to accomplish the objective of a tandem arc welder wherein the front two electrodes are connected in series and having a current return path through the workpiece.

Having thus described the invention, the following is claimed:

1. An electric arc welder for depositing weld metal along a groove between two edges of a metal workpiece, said welder comprising a first electrode driven by a first wire feeder toward a point in said groove, a second electrode driven by a second wire feeder toward said point and a main power source with a first output terminal connected to said first electrode and a second output terminal connected both to said second electrode and directly or indirectly to said metal workpiece to create a second electrode path and a workpiece path, said power source including a high speed switching output stage for creating current with a selected AC waveform between said first and second output terminals, said waveform of said main power source having an independently adjustable frequency unrelated to a line frequency of line voltage provided to the main power source and said waveform being generated by a waveform generator controlling a pulse width modulator circuit to determine the current operation of said output stage and a device for moving said electrodes in unison along said groove in a given direction.

2. An electric arc welder, as defined in claim 1, including a third electrode behind said first and second electrodes and generally movable with said first and second electrodes, said third electrode powered by an auxiliary power source separate from said main power source with a first output terminal connected to said third electrode and a second output terminal connected to said workpiece.

3. An electric arc welder as defined in claim 2 wherein said auxiliary power source includes a high speed switching output stage for creating a selected trailing waveform between said first and second output terminals of said auxiliary power source, said trailing waveform of said auxiliary power source generated by a waveform generator controlling a pulse width modulator circuit to determine the current operation of said output stage of said auxiliary power source.

4. An electric arc welder, as defined in claim 3, wherein said trailing waveform is an AC waveform.

5. An electric arc welder as defined in claim 4 wherein said main power source includes a first and second module power source connected in parallel with said output terminals of said main power source.

6. An electric arc welder as defined in claim 4 including a second power source in series between said second electrode and said metal workpiece to create said workpiece path for said second output terminal of the main power source.

7. An electric arc welder as defined in claim 6 wherein said second power source has a current output with said selected AC waveform.

8. An electric welder, as defined in claim 3 wherein said trailing waveform is a DC waveform.

9. An electric arc welder as defined in claim 8 wherein said main power source includes a first and second module power source connected in parallel with said output terminals of said main power source.

10. An electric arc welder as defined in claim 8 including a second power source in series between said second electrode and said metal workpiece to create said workpiece path for said second output terminal of the main power source.

11. An electric arc welder as defined in claim 10 wherein said second power source has a current output with said selected AC waveform.

12. An electric arc welder as defined in claim 8 including a flux dispenser in front of said third electrode.

13. An electric arc welder as defined in claim 3 wherein said main power source includes a first and second module power source connected in parallel with said output terminals of said main power source.

14. An electric arc welder as defined in claim 13 including a flux dispenser in front of said third electrode.

15. An electric arc welder as defined in claim 13 wherein said waveform generator of said main power source includes a circuit to adjust the frequency of said AC waveform.

16. An electric arc welder as defined in claim 13 wherein said waveform generator of said main power source includes a circuit to adjust the duty cycle of said AC waveform.

17. An electric arc welder as defined in claim 13 wherein said main power source includes a circuit to adjust the percentage of the positive portion of said AC waveform compared to said negative portion of said AC waveform.

18. An electric arc welder as defined in claim 3 including a second power source in series between said second electrode and said metal workpiece to create said workpiece path for said second output terminal of the main power source.

19. An electric arc welder as defined in claim 18 wherein said second power source has a current output with said selected AC waveform.

20. An electric arc welder as defined in claim 18 wherein said waveform generator of said main power source includes a circuit to adjust the frequency of said AC waveform.

21. An electric arc welder as defined in claim 18 wherein said waveform generator of said main power source includes a circuit to adjust the duty cycle of said AC waveform.

22. An electric arc welder as defined in claim 18 wherein said main power source includes a circuit to adjust the percentage of the positive portion of said AC waveform compared to said negative portion of said AC waveform.

23. An electric arc welder as defined in claim 3 including a back plate below said groove and under said workpiece.

24. An electric arc welder as defined in claim 23 wherein said waveform generator of said main power source includes a circuit to adjust the frequency of said AC waveform.

25. An electric arc welder as defined in claim 23 wherein said waveform generator of said main power source includes a circuit to adjust the duty cycle of said AC waveform.

26. An electric arc welder as defined in claim 23 wherein said main power source includes a circuit to adjust the percentage of the positive portion of said AC waveform compared to said negative portion of said AC waveform.

27. An electric arc welder as defined in claim 3 including a flux dispenser in front of said third electrode.

28. An electric arc welder as defined in claim 27 wherein said waveform generator of said main power source includes a circuit to adjust the frequency of said AC waveform.

29. An electric arc welder as defined in claim 27 wherein said waveform generator of said main power source includes a circuit to adjust the duty cycle of said AC waveform.

30. An electric arc welder as defined in claim 27 wherein said main power source includes a circuit to adjust the percentage of the positive portion of said AC waveform compared to said negative portion of said AC waveform.

31. An electric arc welder as defined in claim 3 wherein said waveform generator of said main power source includes a circuit to adjust the frequency of said AC waveform.

32. An electric arc welder as defined in claim 3 wherein said waveform generator of said main power source includes a circuit to adjust the duty cycle of said AC waveform.

33. An electric arc welder as defined in claim 3 wherein said main power source includes a circuit to adjust the percentage of the positive portion of said AC waveform compared to said negative portion of said AC waveform.

34. An electric arc welder as defined in claim 2 wherein said main power source includes a first and second module power source connected in parallel with said output terminals of said main power source.

35. An electric arc welder as defined in claim 34 wherein said first wire feeder is driven by said first module power source and said second wire feeder is driven by said second module power source.

36. An electric arc welder as defined in claim 34 including a back plate below said groove and under said workpiece.

37. An electric arc welder as defined in claim 34 including a flux dispenser in front of said third electrode.

38. An electric arc welder as defined in claim 34 wherein said waveform generator of said main power source includes a circuit to adjust the frequency of said AC waveform.

39. An electric arc welder as defined in claim 34 wherein said waveform generator of said main power source includes a circuit to adjust the duty cycle of said AC waveform.

40. An electric arc welder as defined in claim 34 wherein said main power source includes a circuit to adjust the percentage of the positive portion of said AC waveform compared to said negative portion of said AC waveform.

41. An electric arc welder as defined in claim 2 including a second power source in series between said second electrode and said metal workpiece to create said workpiece path for said second output terminal of the main power source.

42. An electric arc welder as defined in claim 41 wherein said first wire feeder is driven by said main power source and said second wire feeder is driven by said second power source.

43. An electric arc welder as defined in claim 42 wherein said second power source has a current output with said selected AC waveform.

44. An electric arc welder as defined in claim 41 wherein said second power source has a current output with said selected AC waveform.

45. An electric arc welder as defined in claim 41 including a back plate below said groove and under said workpiece.

46. An electric arc welder as defined in claim 41 including a flux dispenser in front of said third electrode.

47. An electric arc welder as defined in claim 41 wherein said waveform generator of said main power source includes a circuit to adjust the frequency of said AC waveform.

48. An electric arc welder as defined in claim 41 wherein said waveform generator of said main power source includes a circuit to adjust the duty cycle of said AC waveform.

49. An electric arc welder as defined in claim 41 wherein said main power source includes a circuit to adjust the percentage of the positive portion of said AC waveform compared to said negative portion of said AC waveform.

50. An electric arc welder as defined in claim 2 including a back plate below said groove and under said workpiece.

51. An electric arc welder as defined in claim 50 including a flux dispenser in front of said third electrode.

52. An electric arc welder as defined in claim 50 wherein said waveform generator of said main power source includes a circuit to adjust the frequency of said AC waveform.

53. An electric arc welder as defined in claim 50 wherein said waveform generator of said main power source includes a circuit to adjust the duty cycle of said AC waveform.

54. An electric arc welder as defined in claim 50 wherein said main power source includes a circuit to adjust the percentage of the positive portion of said AC waveform compared to said negative portion of said AC waveform.

55. An electric arc welder as defined in claim 2 including a flux dispenser in front of said third electrode.

56. An electric arc welder as defined in claim 55 wherein said waveform generator of said main power source includes a circuit to adjust the frequency of said AC waveform.

57. An electric arc welder as defined in claim 55 wherein said waveform generator of said main power source includes a circuit to adjust the duty cycle of said AC waveform.

58. An electric arc welder as defined in claim 55 wherein said main power source includes a circuit to adjust the percentage of the positive portion of said AC waveform compared to said negative portion of said AC waveform.

59. An electric arc welder as defined in claim 2 wherein said waveform generator of said main power source includes a circuit to adjust the frequency of said AC waveform.

60. An electric arc welder as defined in claim 2 wherein said waveform generator of said main power source includes a circuit to adjust the duty cycle of said AC waveform.

61. An electric arc welder as defined in claim 2 wherein said main power source includes a circuit to adjust the percentage of the positive portion of said AC waveform compared to said negative portion of said AC waveform.

62. An electric arc welder as defined in claim 1 wherein said auxiliary power source includes a high speed switching output stage for creating a selected trailing waveform between said first and second output terminals of said auxiliary power source, said trailing waveform of said auxiliary power source generated by a waveform generator controlling a pulse width modulator circuit to determine the current operation of said output stage of said auxiliary power source.

63. An electric arc welder, as defined in claim 62, wherein said trailing waveform is an AC waveform.

64. An electric arc welder as defined in claim 63 wherein said main power source includes a first and second module power source connected in parallel with said output terminals of said main power source.

65. An electric arc welder as defined in claim 63 including a second power source in series between said second electrode and said metal workpiece to create said workpiece path for said second output terminal of the main power source.

66. An electric arc welder as defined in claim 65 wherein said second power source has a current output with said selected AC waveform.

67. An electric arc welder as defined in claim 63 wherein said waveform generator of said main power source includes a circuit to adjust the frequency of said AC waveform.

68. An electric arc welder as defined in claim 63 wherein said waveform generator of said main power source includes a circuit to adjust the duty cycle of said AC waveform.

69. An electric arc welder as defined in claim 63 wherein said main power source includes a circuit to adjust the percentage of the positive portion of said AC waveform compared to said negative portion of said AC waveform.

70. An electric welder, as defined in claim 62 wherein said trailing waveform is a DC waveform.

71. An electric arc welder as defined in claim 70 wherein said main power source includes a first and second module power source connected in parallel with said output terminals of said main power source.

72. An electric arc welder as defined in claim 70 including a second power source in series between said second electrode and said metal workpiece to create said workpiece path for said second output terminal of the main power source.

73. An electric arc welder as defined in claim 72 wherein said second power source has a current output with said selected AC waveform.

74. An electric arc welder as defined in claim 62 wherein said main power source includes a first and second module power source connected in parallel with said output terminals of said main power source.

75. An electric arc welder as defined in claim 62 including a second power source in series between said second electrode and said metal workpiece to create said workpiece path for said second output terminal of the main power source.

76. An electric arc welder as defined in claim 75 wherein said second power source has a current output with said selected AC waveform.

77. An electric arc welder as defined in claim 62 wherein said waveform generator of said main power source includes a circuit to adjust the frequency of said AC waveform.

78. An electric arc welder as defined in claim 62 wherein said waveform generator of said main power source includes a circuit to adjust the duty cycle of said AC waveform.

79. An electric arc welder as defined in claim 62 wherein said main power source includes a circuit to adjust the percentage of the positive portion of said AC waveform compared to said negative portion of said AC waveform.

80. An electric arc welder as defined in claim 1 wherein said main power source includes a first and second module power source connected in parallel with said output terminals of said main power source.

81. An electric arc welder as defined in claim 80 wherein said first wire feeder is driven by said first module power source and said second wire feeder is driven by said second module power source.

82. An electric arc welder as defined in claim 80 including a back plate below said groove and under said workpiece.

83. An electric arc welder as defined in claim 80 wherein said waveform generator of said main power source includes a circuit to adjust the frequency of said AC waveform.

84. An electric arc welder as defined in claim 80 wherein said waveform generator of said main power source includes a circuit to adjust the duty cycle of said AC waveform.

85. An electric arc welder as defined in claim 80 wherein said main power source includes a circuit to adjust the percentage of the positive portion of said AC waveform compared to said negative portion of said AC waveform.

86. An electric arc welder as defined in claim 1 including a second power source in series between said second electrode and said metal workpiece to create said workpiece path for said second output terminal of the main power source.

87. An electric arc welder as defined in claim 86 wherein said first wire feeder is driven by said main power source and said second wire feeder is driven by said second power source.

88. An electric arc welder as defined in claim 87 wherein said second power source has a current output with said selected AC waveform.

89. An electric arc welder as defined in claim 86 wherein said second power source has a current output with said selected AC waveform.

90. An electric arc welder as defined in claim 86 including a back plate below said groove and under said workpiece.

91. An electric arc welder as defined in claim 86 wherein said waveform generator of said main power source includes a circuit to adjust the frequency of said AC waveform.

92. An electric arc welder as defined in claim 86 wherein said waveform generator of said main power source includes a circuit to adjust the duty cycle of said AC waveform.

93. An electric arc welder as defined in claim 86 wherein said main power source includes a circuit to adjust the percentage of the positive portion of said AC waveform compared to said negative portion of said AC waveform.

94. An electric arc welder as defined in claim 1 including a back plate below said groove and under said workpiece.

95. An electric arc welder as defined in claim 94 wherein said waveform generator of said main power source includes a circuit to adjust the frequency of said AC waveform.

96. An electric arc welder as defined in claim 94 wherein said waveform generator of said main power source includes a circuit to adjust the duty cycle of said AC waveform.

97. An electric arc welder as defined in claim 94 wherein said main power source includes a circuit to adjust the percentage of the positive portion of said AC waveform compared to said negative portion of said AC waveform.

98. An electric arc welder as defined in claim 1 wherein said waveform generator of said main power source includes a circuit to adjust the frequency of said AC waveform.

99. An electric arc welder as defined in claim 1 wherein said waveform generator of said main power source includes a circuit to adjust the duty cycle of said AC waveform.

100. An electric arc welder as defined in claim 1 wherein said main power source includes a circuit to adjust the percentage of the positive portion of said AC waveform compared to said negative portion of said AC waveform.

101. An electric arc welder for depositing weld metal along a groove between two edges of a metal workpiece, said welder comprising: a first electrode driven by a first wire feeder at a first wire feed speed toward a point in said groove; a second electrode driven by a second wire feeder at a second wire feed speed toward said point, said first and second wire feed speeds being separately controlled; a main power source with a first output terminal connected to said first electrode and a second output terminal connected to said second electrode to create a series electrode path, said power source including a high speed switching output stage for creating current with a selected waveform between said first and second output terminals, said waveform of said main power source having an independently adjustable frequency unrelated to a line frequency of line voltage provided to the main power source and said waveform being generated by a waveform generator controlling a pulse width modulator circuit to determine the current operation of said main power source; and a device for moving said electrodes in unison along said groove in a given direction.

102. An electric arc welder as defined in claim 101, wherein said second output terminal is further connected directly or indirectly to said metal workpiece to create a workpiece path.

103. An electric arc welder as defined in claim 102, wherein said selected waveform is an AC waveform.

104. An electric arc welder as defined in claim 103 including a second power source in series between said second electrode and said metal workpiece to create said workpiece path for said second output terminal of the main power source.

105. An electric arc welder as defined in claim 104 wherein said first wire feeder has a speed control signal created by said main power source and said second wire feeder has a speed control signal created by said second power source.

106. An electric arc welder as defined in claim 102 including a second power source in series between said second electrode and said metal workpiece to create said workpiece path for said second output terminal of the main power source.

107. An electric arc welder as defined in claim 106 wherein said first wire feeder has a speed control signal created by said main power source and said second wire feeder has a speed control signal created by said second power source.

108. An electric arc welder as defined in claim 101, wherein said selected waveform is an AC waveform.

109. An electric arc welder as defined in claim 108 including a second power source in series between said second electrode and said metal workpiece to create a workpiece path for said second output terminal of the main power source.

110. An electric arc welder as defined in claim 109 wherein said first wire feeder has a speed control signal created by said main power source and said second wire feeder has a speed control signal created by said second power source.

111. An electric arc welder as defined in claim 101 including a second power source in series between said second electrode and said metal workpiece to create a workpiece path for said second output terminal of said main power source.

112. An electric arc welder as defined in claim 111 wherein said first wire feeder has a speed control signal created by said main power source and said second wire feeder has a speed control signal created by said second power source.

113. An electric arc welder as defined in claim 101, wherein the first and second wire feed speeds are different.

114. An electric arc welder for depositing weld metal along a groove between two edges of a metal workpiece, said welder comprising: a first electrode driven at a first wire feed speed by a first wire feeder toward a point in said groove; a second electrode driven at a second wire feed speed by a second wire feeder toward said point; a first power source with an output terminal connected to said first electrode; and a second power source with an output terminal connected to said second electrode, said electrodes and power sources being connected to form a series circuit path with said power sources providing current in said series circuit path for depositing weld metal along said workpiece groove, said first wire feeder being driven by one of said power sources to control said first wire feed speed, and said second wire feeder being driven by the other of said power sources to control said second wire feed speed.

115. An electric arc welder as defined in claim 114, wherein said first wire feeder is driven by one of said power sources to control said first wire feed speed, and said second wire feeder is driven by the other of said power sources to control said second wire feed speed.

116. An electric arc welder as defined in claim 115, wherein said first power source drives said second wire feeder to control said second wire feed speed and said second power source drives said first wire feeder to control said first wire feed speed.

117. An electric arc welder as defined in claim 116, wherein said first and second wire feed speeds are different.

118. An electric arc welder as defined in claim 116, wherein one of said power sources includes another terminal connected to said workpiece.

119. An electric arc welder as defined in claim 115, wherein said first power source drives said first wire feeder to control said first wire feed speed and said second power source drives said second wire feeder to control said second wire feed speed.

120. An electric arc welder as defined in claim 119, wherein said first and second wire feed speeds are different.

121. An electric arc welder as defined in claim 119, wherein one of said power sources includes another terminal connected to said workpiece.

122. An electric arc welder as defined in claim 115, wherein said first and second wire feed speeds are different.

123. An electric arc welder as defined in claim 122, wherein one of said power sources includes another terminal connected to said workpiece.

124. An electric arc welder as defined in claim 115, wherein one of said power sources includes another terminal connected to said workpiece.

125. An electric arc welder as defined in claim 115, wherein at least one of said power sources includes a high speed switching output stage for creating current with a selected waveform in said series circuit path, said waveform having an independently adjustable frequency unrelated to a line frequency of line voltage provided to the main power source and said waveform being generated by a waveform generator controlling a pulse width modulator circuit to determine the current operation of said at least one of said power sources.

* * * * *